United States Patent
Ohba et al.

(10) Patent No.: US 9,247,132 B2
(45) Date of Patent: Jan. 26, 2016

(54) MOVING PICTURE CAPTURING DEVICE, INFORMATION PROCESSING SYSTEM, INFORMATION PROCESSING DEVICE, AND IMAGE DATA PROCESSING METHOD

(75) Inventors: Akio Ohba, Kanagawa (JP); Hiroyuki Segawa, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 323 days.

(21) Appl. No.: 14/116,630

(22) PCT Filed: Apr. 5, 2012

(86) PCT No.: PCT/JP2012/002397
§ 371 (c)(1),
(2), (4) Date: Nov. 8, 2013

(87) PCT Pub. No.: WO2012/157178
PCT Pub. Date: Nov. 22, 2012

(65) Prior Publication Data
US 2014/0078265 A1 Mar. 20, 2014

(30) Foreign Application Priority Data
May 19, 2011 (JP) .................... 2011-112931

(51) Int. Cl.
*G06F 3/00* (2006.01)
*H04N 13/02* (2006.01)
(Continued)

(52) U.S. Cl.
CPC ............ *H04N 5/23232* (2013.01); *G06F 3/005* (2013.01); *G06F 3/011* (2013.01);
(Continued)

(58) Field of Classification Search
None
See application file for complete search history.

(56) References Cited

U.S. PATENT DOCUMENTS

| | | | | |
|---|---|---|---|---|
| 6,714,660 B1 * | 3/2004 | Ohba | ...................... | G06F 3/012 345/204 |
| 7,200,247 B2 * | 4/2007 | Ohba | ...................... | G06F 3/012 345/204 |

(Continued)

FOREIGN PATENT DOCUMENTS

| | | |
|---|---|---|
| EP | 0999518 A1 | 5/2000 |
| JP | 690444 A | 3/1994 |

(Continued)

OTHER PUBLICATIONS

International Search Report for corresponding PCT Application PCT/JP2012/002397, dated Jun. 26, 2012.

(Continued)

*Primary Examiner* — Jayanti K Patel
*Assistant Examiner* — Reza Aghevli
(74) *Attorney, Agent, or Firm* — Matthew B. Dernier, Esq.

(57) ABSTRACT

An image synthesis unit receives respective pixel values for a single horizontal row of a ¼ demosaiced image, a ¹⁄₁₆ demosaiced image, and a ¹⁄₆₄ demosaiced image from a pyramid filter for reducing, in a plurality of stages, a frame of a moving image that is captured. The image synthesis unit then connects the pixel values in a predetermined rule so as to generate a virtual synthesized image and outputs the synthesized image in the form of streams. A control unit of an image transmission unit notifies a data selection unit of a request from a host terminal. The data selection unit selects and extracts necessary data from respective streams of pieces of data of the synthesized image, a RAW image, and a 1/1 demosaiced image, and generates a stream of data to be transmitted. A packetizing unit packetizes the stream and transmits the packetized stream to the host terminal.

13 Claims, 14 Drawing Sheets

(51) Int. Cl.
  *G06F 3/01* (2006.01)
  *H04N 21/422* (2011.01)
  *H04N 5/232* (2006.01)
  *H04N 5/262* (2006.01)
  *H04N 21/4223* (2011.01)
  *H04N 21/4402* (2011.01)
  *H04N 21/4788* (2011.01)
  *H04N 21/442* (2011.01)

(52) U.S. Cl.
  CPC ......... *H04N5/23219* (2013.01); *H04N 5/2628* (2013.01); *H04N 13/0239* (2013.01); *H04N 21/4223* (2013.01); *H04N 21/44218* (2013.01); *H04N 21/440263* (2013.01); *H04N 21/4788* (2013.01)

(56) References Cited

U.S. PATENT DOCUMENTS 7,289,142 B2 * 10/2007 Silverbrook ......... B41J 2/14314
  348/221.1
2004/0240740 A1  12/2004 Oba
2008/0024596 A1 * 1/2008 Li ..................... H04N 5/2257
  348/47
2012/0127337 A1 * 5/2012 Okada ................ H04N 5/3537
  348/223.1
2012/0218438 A1  8/2012 Oba

FOREIGN PATENT DOCUMENTS

JP  2004195243 A  7/2004
JP   201197521 A  5/2011
WO  2011052114 A1  5/2011

OTHER PUBLICATIONS

Supplementary European Search Report for corresponding EP Application EP12785074.1, dated Oct. 15, 2014.

International Preliminary Report on Patentability and Written Opinion for corresponding PCT Application PCT/JP2012/002397, dated Nov. 28, 2013.

* cited by examiner

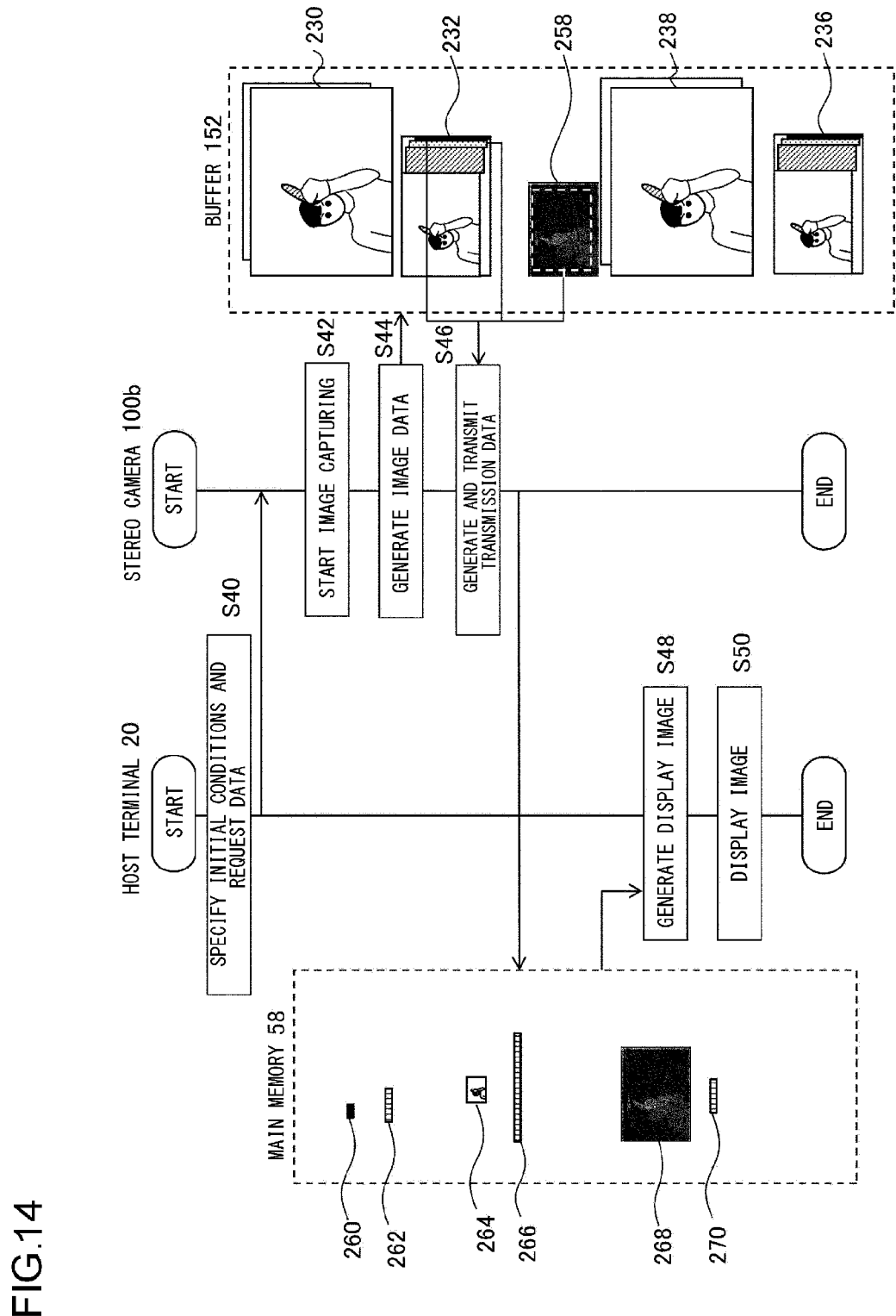

MOVING PICTURE CAPTURING DEVICE, INFORMATION PROCESSING SYSTEM, INFORMATION PROCESSING DEVICE, AND IMAGE DATA PROCESSING METHOD

CROSS REFERENCE TO RELATED APPLICATIONS

This application claims priority to International Application No. PCT/JP2012/002397, filed Apr. 5, 2012, which claims priority to Japanese Application No. JP2011-112931, filed May 19, 2011, the entire disclosure of which are hereby incorporated by reference.

TECHNICAL FIELD

The present invention relates to a technology for performing information processing according to the movement of an object.

BACKGROUND ART

In the related art, games are known in which the image of a part of a user's body such as a head is captured by a video camera, in which a predetermined area for an eye, a mouth, a hand, or the like is then extracted, and in which the area is replaced with another image for display on a display (for example, patent document No. 1). A user interface is also known that receives, as an instruction for operating an application, the movement of a mouth or a hand captured by a video camera.

[Patent document No. 1] European Patent Application No. 0999518

DISCLOSURE OF THE INVENTION

Problem to be Solved by the Invention

In a technique such as the one described above, a high-resolution image is necessary for extracting a predetermined area for a user's mouth, hand, or the like. However, as the performance of an imaging element of a video camera becomes higher, the amount of data becomes increased due to an improvement in resolution or the like. Thus, there arises a problem where data mining processing costs for filtering, scaling, cropping, and the like for providing, in an appropriate scale, information necessary for transfer, compression for transfer, expansion processing and recognition, detection, measurement processing, and the like are increased and where latency from camera input to each processing output becomes increased. The use of the camera as a user interface creates a problem where an increase in the latency dramatically reduces usability. As described, even when the performance of an imaging element of a video camera is increased, the performance of a system as a whole may be reduced.

In this background, a purpose of the present invention is to provide an image processing technology for suppressing latency from the time of image capturing to the time of image display using the data thereof while using a high-performance imaging element.

Means to Solve the Problem

One embodiment of the present invention relates to a moving image capturing device. The moving image capturing device comprises: an image data generation unit configured to generate respective pieces of data of a plurality of images having different resolutions each in a predetermined pixel order by reducing, in multi-stages, each frame of a moving image acquired by image capturing of an object and to sequentially output the pieces of data in the form of streams; an image synthesis unit configured to generate, by connecting, for each row of pixels for a single horizontal row of an image or for each row of pixels in a smaller range, respective pieces of data of a plurality of predetermined images among the respective pieces of data of the plurality of images output by the image data generation unit and then by outputting the respective pieces of data of the plurality of predetermined images in the form of streams, a virtual synthesized image containing the plurality of predetermined images; and an image transmission unit configured to generate a stream of data to be transmitted, upon receiving a request for transmitting the data from a host terminal to which the image transmission unit is connected, by extracting data for pixels included in an image and an area that are requested from a plurality of streams that are output from the image data generation unit and the image synthesis unit and to transmit the stream of data to the host terminal.

Another embodiment of the present invention also relates to a moving image capturing device. The moving image capturing device comprises a pair of cameras for capturing an image of a single object from different right and left viewpoints, wherein each of the pair of cameras includes: an image data generation unit configured to generate respective pieces of data of a plurality of images having different resolutions each in a predetermined pixel order by reducing, in multi-stages, each frame of a moving image acquired by capturing an image of the object and to sequentially output the pieces of data in the form of streams; and an image synthesis unit configured to generate, by connecting, for each row of pixels for a single horizontal row of an image or for each row of pixels in a smaller range, respective pieces of data of a plurality of predetermined images among the respective pieces of data of the plurality of images output by the image data generation unit and then by outputting the respective pieces of data of the plurality of predetermined images in the form of streams, a virtual synthesized image containing the plurality of predetermined images, and wherein the moving image capturing device further comprises: a stereo matching processing unit configured to generate a depth image that indicates the position of the object in a three-dimensional space in a predetermined pixel order by performing stereo matching on respective pieces of data of images having a predetermined resolution among respective pieces of data of images of different viewpoints that are generated by the pair of cameras and to sequentially output the depth image in the form of streams; and an image transmission unit configured to generate a stream of data to be transmitted, upon receiving a request for transmitting data from a host terminal to which the image transmission unit is connected, by extracting data of pixels included in an image and an area that are requested from a plurality of streams that are output from the image data generation unit, the image synthesis unit, and the stereo matching processing unit and to transmit the stream of data to the host terminal.

Still another embodiment of the present invention relates to an information processing system. The information processing system comprises: a moving image capturing device for capturing an image of an object and generating data of a moving image; and a host terminal for acquiring a part of the data of the moving image from the moving image capturing device and displaying an image after performing a predetermined image process using the part of the data, wherein the moving image capturing device includes: an image data generation unit configured to generate respective pieces of data of a plurality of images having different resolutions each in a predetermined pixel order by reducing, in multi-stages, each frame of a moving image acquired by image capturing and to sequentially output the pieces of data in the form of streams; an image synthesis unit configured to generate, by connecting, for each row of pixels for a single horizontal row of an image or for each row of pixels in a smaller range, respective pieces of data of a plurality of predetermined images among the respective pieces of data of the plurality of images output by the image data generation unit and then by outputting the respective pieces of data of the plurality of predetermined images in the form of streams, a virtual synthesized image containing the plurality of predetermined images; and an image transmission unit configured to generate a stream of data to be transmitted by extracting data for pixels included in an image and an area that are requested from a plurality of streams that are output from the image data generation unit and the image synthesis unit and then to transmit the stream of data to the host terminal.

Yet another embodiment of the present invention relates to an information processing device. The information processing device comprises: a data request unit configured to request a camera capturing an image of an object to transmit image data of a frame of a moving image by specifying a resolution and an area within an image; a data deploying unit configured to deploy the image data, which is transmitted from the camera according to a request, in a state of a stream in which pixel values of the specified area are connected for each row of pixels, as two-dimensional image data; and a data processing unit configured to display an image after performing a predetermined image process using the two-dimensional image data, wherein the data request unit specifies a synthesized image, which is generated inside the camera, in which a plurality of images having different resolutions obtained by reducing the frame of the moving image in multi-stages are arranged in respective predetermined rectangular areas, and wherein the data deploying unit performs image separation by deploying the synthesized image transmitted from the camera into an individual piece of two-dimensional image data for each of images subject to synthesis.

Yet another embodiment of the present invention relates to an image data processing method. The image data processing method performed by a moving image capturing device, comprises: generating respective pieces of data of a plurality of images having different resolutions each in a predetermined pixel order by reducing, in multi-stages, each frame of a moving image acquired by capturing an image of an object and sequentially outputting the pieces of data in the form of streams; generating, by connecting, for each row of pixels for a single horizontal row of an image or for each row of pixels in a smaller range, respective pieces of data of a plurality of predetermined images among the respective pieces of data of the plurality of images output in the outputting and then by outputting the respective pieces of data of the plurality of predetermined images in the form of streams, a virtual synthesized image containing the plurality of predetermined images; and generating a stream of data to be transmitted, upon receiving a request for transmitting data from a host terminal to which the image transmission unit is connected, by extracting data for pixels included in an image and an area that are requested from a plurality of streams output in the outputting and in the generation and transmitting the stream of data to the host terminal.

Optional combinations of the aforementioned constituting elements, and implementations of the invention in the form of methods, apparatuses, systems, computer programs, and recording media recording computer programs may also be practiced as additional modes of the present invention.

Advantage of the Invention

According to the present invention, latency from the time of image capturing to the time of image display using the data thereof can be suppressed.

BRIEF DESCRIPTION OF THE DRAWINGS

FIG. 14 is a diagram illustrating a flowchart showing another example of the processing procedure of the image process performed by the host terminal and the stereo camera in cooperation with each other in the third embodiment and illustrating image examples that are produced.

BEST MODE FOR CARRYING OUT THE INVENTION

First Embodiment

Figure 1:
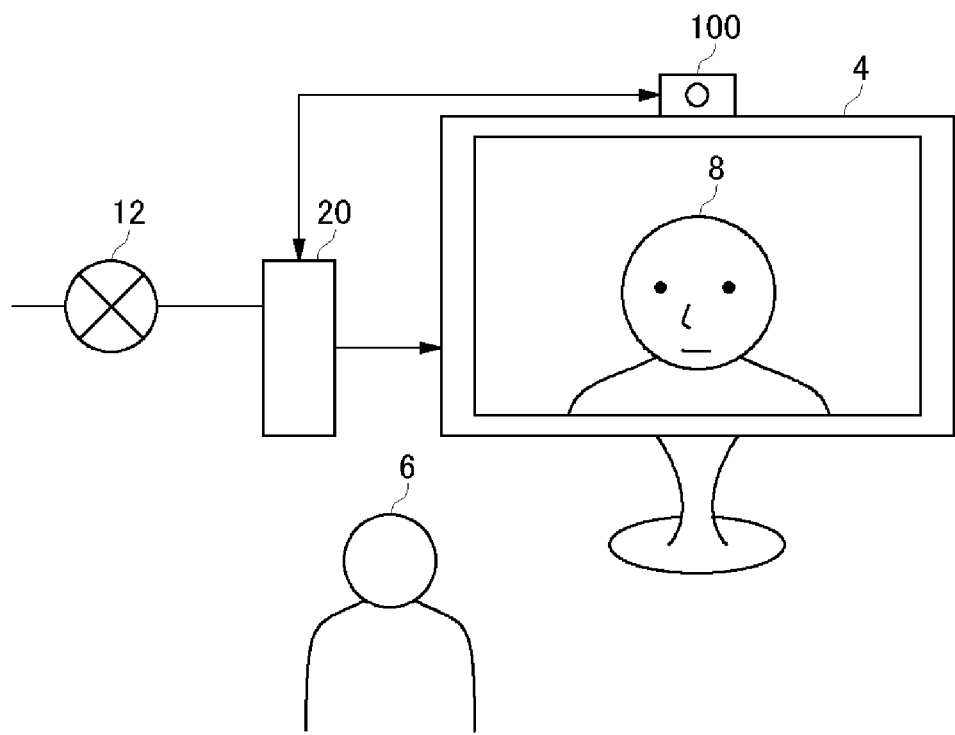
FIG. 1 is a diagram illustrating the whole configuration of a low-latency camera system according to a first embodiment.

FIG. 1 illustrates the whole configuration of a low-latency camera system 10 according to the present embodiment. In this system, a moving image of a user 6 is captured by a camera 100, and an image process is performed based on the data thereof in a host terminal 20. Then, a result thereof is shown on a display 4 or transmitted to a predetermined communication destination via a network 12 such as the Internet or a LAN (Local Area Network).

The camera 100 is a digital video camera provided with an imaging element such as a CCD (Charge Coupled Device) or a CMOS (Complementary Metal Oxide Semiconductor) and is provided on the top of a housing of the display 4 as shown in the figure. The display 4 is, for example, a liquid crystal television, a plasma television, a PC display, or the like. Normally, the user 6 stands in front of the display 4 such that an image of the entire or a part of the body of the user is captured by the camera 100.

An image shown on the display 4 varies depending on an application run in the low-latency camera system 10. For example, when the low-latency camera system 10 is used as a user interface (UI) that recognizes the movement or expression of the user 6 and interprets the movement or expression as some sort of operation instruction, an image 8 shown on the display 4 is an image of a part of the user 6, such as a face or a hand, or of the entire body. When the low-latency camera system 10 is used for video chatting, the image 8 shown on the display 4 is an image of a face of a chat partner, and an image of the user 6 is shown on a chat partner's display via the network 12.

In light of a mode of use such as those described above, the camera 100 is most suitably provided on top of the display 4. However, as long as an image of the entire or a part of the body of the user 6 can be captured, the camera 100 may be placed at a location other than the proximity of the display 4, e.g., in the proximity of the host terminal 20 or around the user. In stead of providing the camera 100 as a single structure, the camera 100 may be embedded in the housing of the display 4 or the like. Instead of using an imaging element in the camera 100, an analog image may be analog-to-digital (A/D) converted for use.

The host terminal 20 is a computer terminal such as a personal computer or a game device that is provided with an image processing function. The host terminal 20 sequentially takes in, in chronological order, each frame or various data that can be obtained from each frame of a moving image obtained by the image capturing of the user 6 using the camera 100 and performs a predetermined image process. In the case of a video chat application, an image of the user 6 is transmitted to a chat partner via the network 12 in real time. In the case of a user interface application, a predetermined information process is performed based on an image of the user 6, various data that can be obtained from the image, or the like, and a result thereof is then output to the display 4.

For example, an image of a character that moves in response to the movement of the user 6 or an image in which an item such as a sword is put into a hand of the user 6 is output to the display 4 in real time. A face detection process for the user 6 and a tracking process for a specific part, which are necessary in such an application, may be performed by the host terminal 20. Alternatively, these processes may be performed by the camera 100 as described later, and a result thereof may be transmitted to the host terminal 20 as a part of the "various data".

In the video chat application, a process may be performed such as showing only a face area of the user 6, which is obtained as a result of the face detection process, in high resolution. In addition to the above image processes, the host terminal 20 is also capable of synthesizing an object image such as a menu or a cursor for the execution of various applications and then displaying the synthesized image on the display 4.

As described, there are a variety of possible processes that can be performed using a moving image that is captured by the camera 100 in the low-latency camera system 10, and the details of the processes are not particularly limited. When performing any of the processes, the camera 100 captures a moving image and also performs some sort of process using the moving image that is captured so as to generate a plurality of types of data, in the present embodiment. There are many possible processes that are performed by the camera 100 and even the respective configurations thereof depending on an application, the processing ability of the camera and the host terminal, and the like.

In the present embodiment, the camera 100 generates moving image data that shows, in a plurality of resolutions, a video image being captured by the camera 100 and transmits to the host terminal 20 only a necessary part of the data in accordance with a request from the host terminal 20 in real time. It is assumed that the host terminal 20 is capable of specifying a way of showing an entire image such as resolution, a color system, and components thereof as well as specifying an area in a frame.

For example, by acquiring from the camera 100 data of an entire image of a low resolution and image data of only an area to be noted of an image of a high resolution and then combining these images on an image plane, a moving image can be displayed, in which the area to be noted is shown in detail, while reducing a load of data transmission. This example is effective for video chatting applications or the like if a face area obtained by performing the face detection process in the host terminal 20 is set to be an area to be noted.

Figure 2:
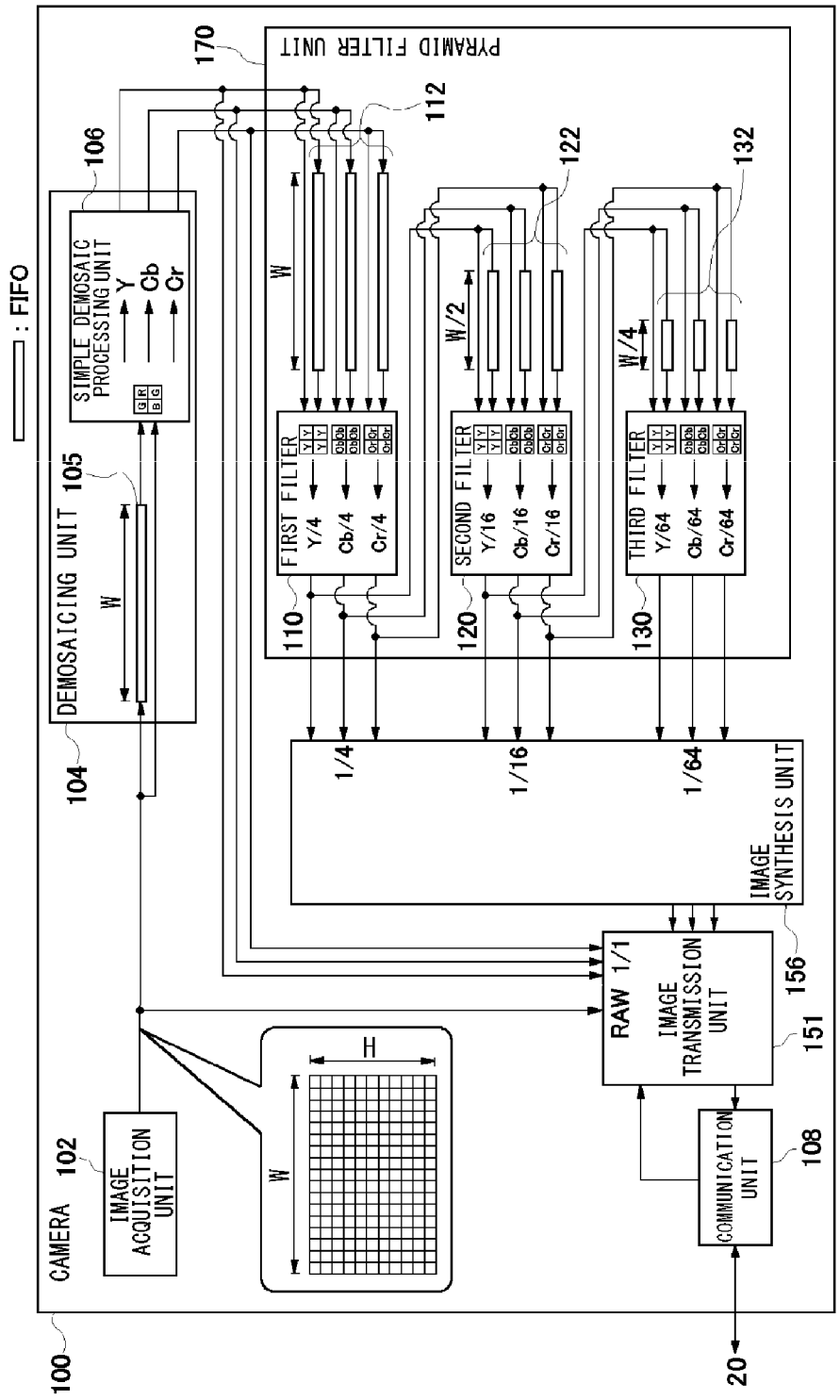
FIG. 2 is a diagram illustrating the configuration of a camera according to the first embodiment.

FIG. 2 illustrates the configuration of the camera 100 according to the embodiment. Features shown in the figure and in FIGS. 3, 4, and 8-11, which are described later, can be implemented by configurations such as a CPU (Central Processing Unit), a RAM (Random Access Memory), a ROM (Read Only Memory) and a rendering circuit in terms of hardware, and by programs for providing various functions such as data input, data storage, image processing, and rendering in terms of software. These figures illustrate functional blocks implemented by the cooperation of those components. Therefore, these functional blocks may be implemented in a variety of forms by combinations of hardware and software. In order to facilitate the explanation, FIG. 2 includes a schematic diagram illustrating an image portion processed in each functional block.

The camera 100 comprises an image acquisition unit 102, a demosaicing unit 104, a pyramid filter unit 170, an image synthesis unit 156, an image transmission unit 151, and a communication unit 108. The image acquisition unit 102 reads, at predetermined timing (e.g., 60 times/sec), an image exposed by an imaging element such as a CCD or a CMOS. In the following explanation, it is assumed that this image has a width of "W" pixels in a horizontal direction and a width of "H" pixels in a vertical direction. This image is a so-called RAW image. The image acquisition unit 102 transmits the RAW image to the demosaicing unit 104 and the image transmission unit 151 every time the exposure is completed for a single horizontal row of the RAW image.

The demosaicing unit 104 has a FIFO (First In First Out) buffer 105 having a capacity of W pixels and a simple demosaic processing unit 106. Pixel information of a single horizontal row of the RAW image is input and stored in the FIFO buffer 105 until pixels for a subsequent horizontal row is input in the demosaicing unit 104. Upon receipt of the pixels for the two horizontal rows, the simple demosaic processing unit 106 performs, using the received pixels, a demosaic process of complementing color information for each pixel based on the surrounding pixels thereof and then creating a full-color image.

As known to a skilled person, there are many methods for this demosaic process. However, a simple demosaic process that uses only the pixels for two horizontal rows is sufficient in this case. As an example, when a pixel for which a corresponding YCbCr value is to be calculated has only a G value, an RGB value is obtained by using an R value obtained by taking an average of the respective R values of right and left adjacent pixels, the G value, and a B value of a pixel above or below the pixel for an R value, a G value, and a B value thereof, respectively, and then substituted into a predetermined conversion equation so as to calculate the YCbCr value. Since such a demosaic process is well known, a further detailed explanation thereof is omitted. A color space of image data that is generated by the demosaicing unit 104 or in a subsequent process is not limited to YCbCr.

The reason for why a simple demosaic process is sufficient is because the RAW image can be used when a high-quality image is necessary. In one variation of a simple demosaic process, a method of forming a YCbCr value of a single pixel from four pixels of RGB may be used. In this case, a demosaiced image of ¼ the size of the RAW image can be obtained. Thus, a first filter 110 described later is not necessary.

As shown in the figure, the simple demosaic processing unit 106 converts RGB of four pixels, which are two horizontal pixels by two vertical pixels, into YCbCr color signals, for example. A block composed of these four pixels is transferred to the image transmission unit 151 as a 1/1 demosaic image and is also transmitted to the pyramid filter unit 170.

The pyramid filter unit 170 has a function of hierarchizing a given image into a plurality of resolutions and outputting the hierarchized image. A pyramid filter is, in general, provided with ¼ reduction filters based on the number of levels of resolutions that are necessary. In the present embodiment, the pyramid filter has three-level filters: a first filter 110 through a third filter 130. Each filter performs a process of bilinear interpolation of four pixels that are adjacent to one another and then computing an average pixel value of the four pixels. Therefore, an image size obtained after the process becomes ¼ the size of the image before the process. A person skilled in the art should easily appreciate that the same applies even when filters other than three-level filters are used.

Before the first filter 110, a single FIFO buffer 112 for W pixels is correspondingly provided for each of Y, Cb, and Cr signals. These FIFO buffers 112 each have a role of storing YCbCr pixels for a single horizontal row until pixels for a subsequent horizontal row are output from the simple demosaic processing unit 106. The storage time of the pixels is determined according to the speed of line scanning of an imaging element. Upon the input of the pixels for two horizontal rows, the first filter 110 averages Y, Cb, and Cr pixel values for four pixels of two horizontal pixels by two vertical pixels. By repeating this process, the length of a 1/1 demosaiced image becomes ½ both vertically and horizontally such that the image is converted to have ¼ the size as a whole. The converted ¼ demosaiced image is transmitted to the image synthesis unit 156 and is also transferred to the subsequent second filter 120.

Before the second filter 120, a single FIFO buffer 122 for W/2 pixels is correspondingly provided for each of Y, Cb, and Cr signals. These FIFO buffers 122 each also have a role of storing YCbCr pixels for a single horizontal row until pixels for a subsequent horizontal row are output from the first filter 110. Upon the input of the pixels for two horizontal rows, the second filter 120 averages Y, Cb, and Cr pixel values for four pixels of two horizontal pixels by two vertical pixels. By repeating this process, the length of the ¼ demosaiced image becomes ½ both vertically and horizontally such that the image is converted to be 1/16 the size as a whole. The converted 1/16 demosaiced image is transmitted to the image synthesis unit 156 and is also transferred to the subsequent third filter 130.

In front of the third filter 130, FIFO buffers 132 for W/4 pixels are provided. Other than this, the same processes as those described above are repeated. A demosaiced image of 1/64 the size is then transmitted to the image synthesis unit 156. Since a pyramid filter such as those shown above is well known, as described in patent document No. 1, a further detailed explanation thereof is omitted in the subject specification.

As described, outputs of images that have been reduced to be ¼ one by one are input to the image synthesis unit 156 from the respective filters of the pyramid filter unit 170. As is evident from this, the size of a FIFO buffer that is necessary before each filter becomes smaller as the number of passed filters becomes large in the pyramid filter unit 170. The number of the filters is not limited to three and may be determined appropriately depending on a resolution width that is required.

The image synthesis unit 156 receives the respective YCbCr pixel values of the ¼ demosaiced image, the 1/16 demosaiced image, and the 1/64 demosaiced image from the first filter 110, the second filter 120, and the third filter 130, respectively. The image synthesis unit 156 then generates a new row of pixels where respective rows of pixels of the ¼ demosaiced image, 1/16 demosaiced image, and 1/64 demosaiced image are connected for each of Y, Cb, and Cr pixel values by connecting a row of pixels for a single horizontal row of each of the images or a row of pixels in a range smaller than the single row with one another in a predetermined rule. The row of pixels that has been generated is transmitted to the image transmission unit 151.

According to a data request received from the host terminal 20 via the communication unit 108, the image transmission unit 151 selects necessary data from among a plurality of types of image data that have been input. The image transmission unit 151 packetizes the selected data and transmits the packetized data to the communication unit 108. In the present embodiment, a process performed by the camera 100 is performed in raster order, starting at the upper left of an image and repeating a process from the left to the right in the downward direction. Pixels for a single horizontal row are set to be a basic processing unit. The data format of each type of image to be input to the image transmission unit 151 and the data format of an image to be transmitted to the host terminal 20 are basically streams in which pieces of data, each of which is for a single horizontal row of an image, are connected from the top.

The communication unit 108 transmits the packet to the host terminal 20 in accordance with, for example, a predetermined protocol such as USB 1.0/2.0, or the like. The communication with the host terminal 20 is not limited to a wired communication. For example, the communication may be wireless LAN communication such as IEEE 802.11a/b/g or the like or infrared communication such as IrDA or the like. In FIG. 2, data for Y, data for Cb, and data for Cr are expressed separately, and arrows for data input and output are shown for each data. However, in order to prevent figures from being complicated, the components are shown in a single set hereinafter.

In the present embodiment, data generated by the image synthesis unit 156 is a stream of a series of pixel values in which respective rows of pixels of the three demosaiced images are mixed. Therefore, strictly speaking, an image of a two-dimensional plane is not generated as a result of connecting the three demosaiced images. However, as described later in detail, when the number of pixels corresponding to the number of pixels for a single horizontal row of an image is defined for a stream that is output by the image synthesis unit 156, subsequent processes are the same as those in the data of a RAW image or a 1/1 image in which the image synthesis unit 156 is not involved. As a result, the image synthesis unit 156 substantially generates an image in which the ¼ demosaiced image, ¹⁄₁₆ demosaiced image, and ¹⁄₆₄ demosaiced image are combined. Hereinafter, this virtual image is referred to as a "synthesized image".

Figure 3:
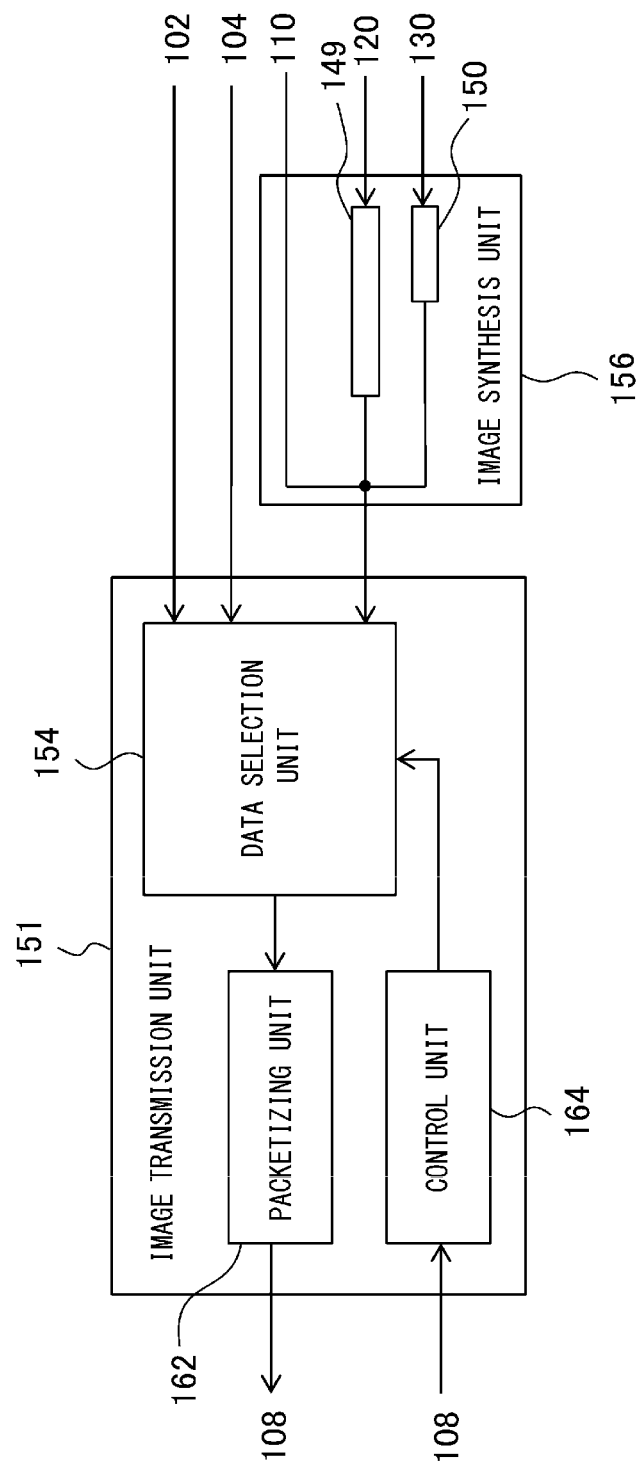
FIG. 3 is a diagram illustrating, in detail, the configuration of an image synthesis unit and the configuration of an image transmission unit of the camera in the first embodiment.

FIG. 3 illustrates the respective configurations of the image synthesis unit 156 and the image transmission unit 151 of the camera 100. The image synthesis unit 156 has FIFO buffers 149 and 150 for temporarily storing, respectively, data for a single horizontal row of the ¹⁄₁₆ demosaiced image and data for a single horizontal row of the ¹⁄₆₄ demosaiced image, which have been respectively acquired from the second filter 120 and the third filter 130.

As described later in detail, the image synthesis unit 156 connects, to data for pixels for a single horizontal row of the ¼ demosaiced image from the first filter 110, data for half the pixels of a row of pixels for the single horizontal row of the ¹⁄₁₆ demosaiced image from the second filter 120 and data for one-fourth the pixels of a row of pixels for the single horizontal row of the ¹⁄₆₄ demosaiced image from the third filter 130 in said order so as to form data for a single horizontal row of the virtual synthesized image.

The image transmission unit 151 has a data selection unit 154, a packetizing unit 162, and a control unit 164. Based on a request from the host terminal 20, the control unit 164 of the image transmission unit 151 indicates to the data selection unit 154 which one of various pieces of image data is to be transmitted as a packet. Using, as input data, data for a row of pixels of the RAW image that has been input from the image acquisition unit 102, data for a row of pixels of the 1/1 demosaiced image that has been input from the demosaicing unit 104, and data for a row of pixels of the synthesized image that has been input from the image synthesis unit 156, the data selection unit 154 selects and extracts data indicated by the control unit 164 and transmits the data to the packetizing unit 162.

At this time, depending on the request from the host terminal 20, the data selection unit 154 transmits a stream of given image data as a whole or transmits only data for a part of a range included in the area to be noted, as described above. In the latter case, a stream is reconstructed by connecting pieces of data to be transmitted. The packetizing unit 162 packetizes, for each size according to a protocol of the communication unit 108, a stream that has been input from the data selection unit 154 and writes the packetized stream in an internal packet buffer (not shown). For example, in the case of a USB, the packetizing unit 162 packetizes a stream for each size of an end point.

The communication unit 108 transmits a packet in the packet buffer to the host terminal 20 in accordance with a predetermined communication protocol. When respective pieces of data of a plurality of images are requested among the data of the RAW image, the data of the 1/1 demosaiced image, and the data of the synthesized image, the data selection unit 154 inputs a plurality of streams that correspond to those pieces of data to the packetizing unit 162. Data transmission with lower latency may be achieved by providing a plurality of channels for output from the data selection unit 154, input to and output from the packetizing unit 162, and input to and output from the communication unit 108 so that the plurality of pieces of data that have been requested are transmitted in parallel. A detailed description will follow regarding this case.

Figure 4:
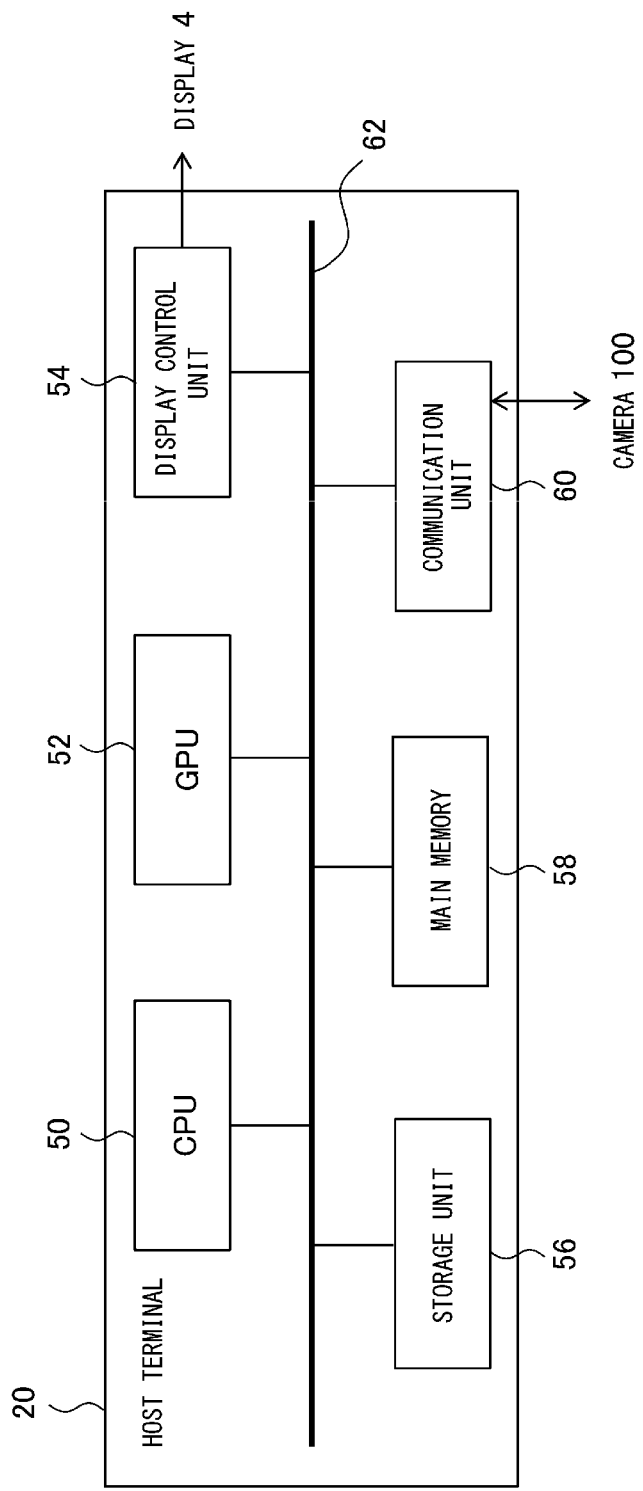
FIG. 4 is a diagram illustrating the configuration of an internal circuit of a host terminal in the first embodiment.

FIG. 4 illustrates the configuration of an internal circuit of the host terminal 20. The host terminal 20 includes a CPU (Central Processing Unit) 50, a GPU (Graphics Processing Unit) 52, a display control unit 54, a storage unit 56, a main memory 58, and a communication unit 60. The CPU 50 processes a signal or controls an internal constitution component based on programs such as an operating system or an application. The GPU 52 performs an image process in accordance with a request from the CPU 50. The display control unit 54 generates a video signal for displaying, on the display 4, image data drawn by the GPU 52 in a frame buffer (not shown).

The storage unit 56 is composed of a hard disk drive, a nonvolatile memory, or the like and stores a program and necessary data for operating the low-latency camera system 10. The main memory 58 is composed of a RAM (Random Access Memory) or the like and stores data that is transmitted from the camera 100 as well as a loaded program and data. The communication unit 60 is a peripheral interface, such as a USB or IEEE 1394, or a wired or wireless LAN network interface. Particularly in the present embodiment, the communication unit 60 transmits a data request signal to the camera 100 and receives data transmitted from the camera 100. These components are mutually connected to one another via a bus 62. The GPU 52 can directly read data, which is necessary for processing, such as texture data from the main memory 58 via the bus 62.

Figure 5:
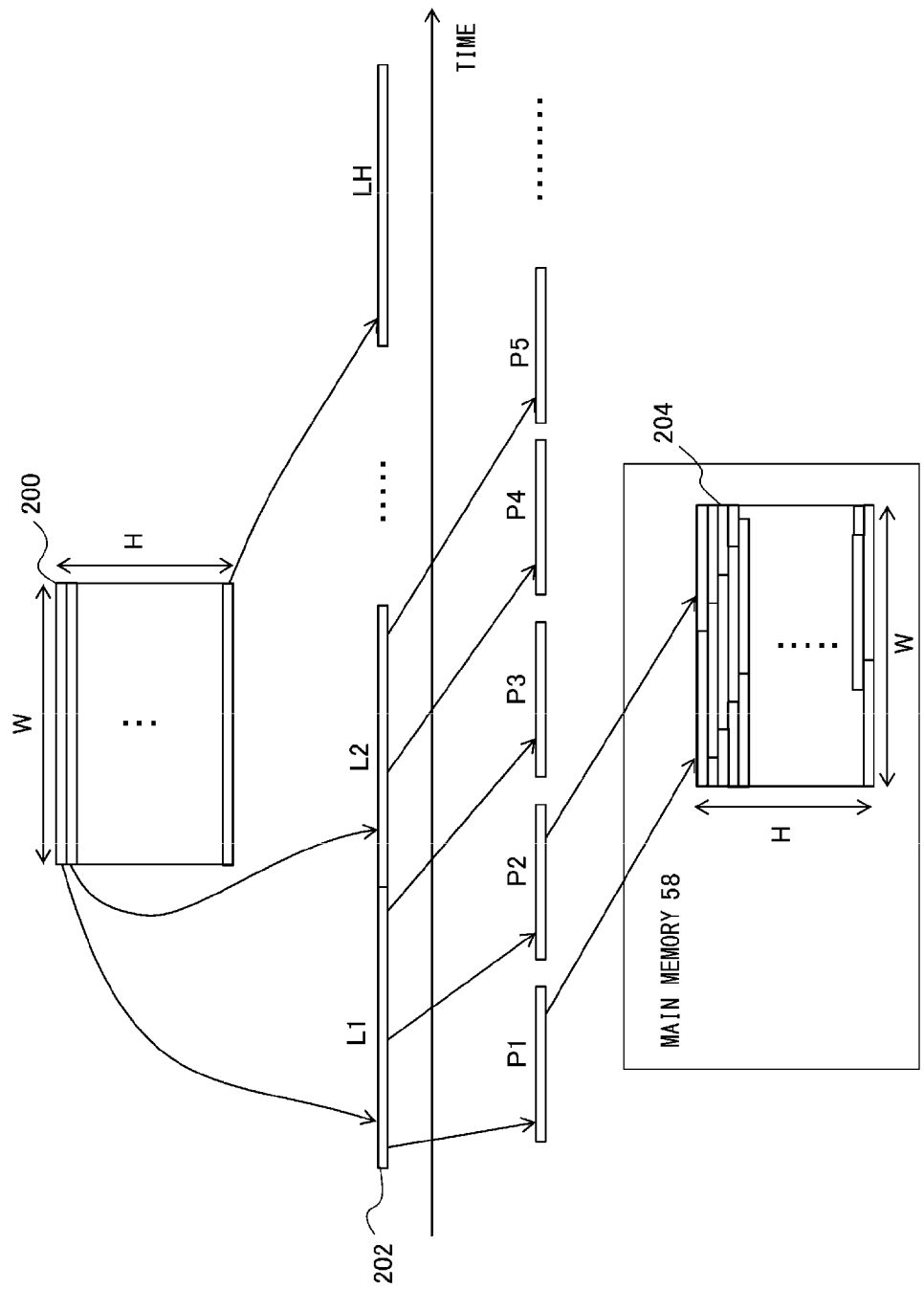
FIG. 5 is a diagram schematically illustrating a basic transition of the form of data in the camera and the host terminal in the first embodiment.

FIG. 5 schematically illustrates a basic transition of the form of data in the camera 100 and the host terminal 20. In this case, as an example, a situation is considered where data of an entire frame image 200 having a width of "W" pixels in a horizontal direction and a width of "H" pixels in a vertical direction is transmitted to the host terminal 20 from the camera 100. As described above, the generation, selection, and transmission of image data are performed in raster order of pixels, and rows of pixels each for a single horizontal row are sequentially connected and processed in a stream format in the present embodiment.

Data that is output by the data selection unit 154 under such a situation is a stream 202. In the figure, the horizontal axis of the stream 202 represents the passage of time, and rectangles L1, L2, . . . , and LH, which constitute the stream 202, represent respective pieces of data of pixels of a first row, pixels of a second row, . . . , and pixels of an $H^{th}$ row of the frame image 200. When the data size of a single pixel is set to be d byte, the data size of each rectangle is W*d bytes.

The packetizing unit 162 breaks the stream 202 for each predetermined size so as to generate packets P1, P2, P3, P4, P5, . . . . This allows the packets P1, P2, P3, P4, P5, . . . to be transmitted to the host terminal 20 from the camera 100 in said order. When the host terminal 20 receives the packets P1, P2, P3, P4, P5, . . . via the communication unit 60, the host terminal 20 stores the packets in the main memory 58 under the control of the CPU 50.

At this time, by arranging the respective pieces of data of the packets in raster order in the main memory 58 such that the arranged data have a horizontal width that accounts for the number ("W") of the pixels of the original frame image 200 in the horizontal direction, the data are deployed at continuous addresses of W*d*H bytes so as to reproduce an image 204. In the figure, rectangles that constitute the image 204 represent pieces of data of respective packets. Under the control of the CPU 50, the GPU 52 renders an image to be displayed on the display 4 by processing the image 204 deployed in the main memory 58 or combining the image 204 with another image.

Figure 6:
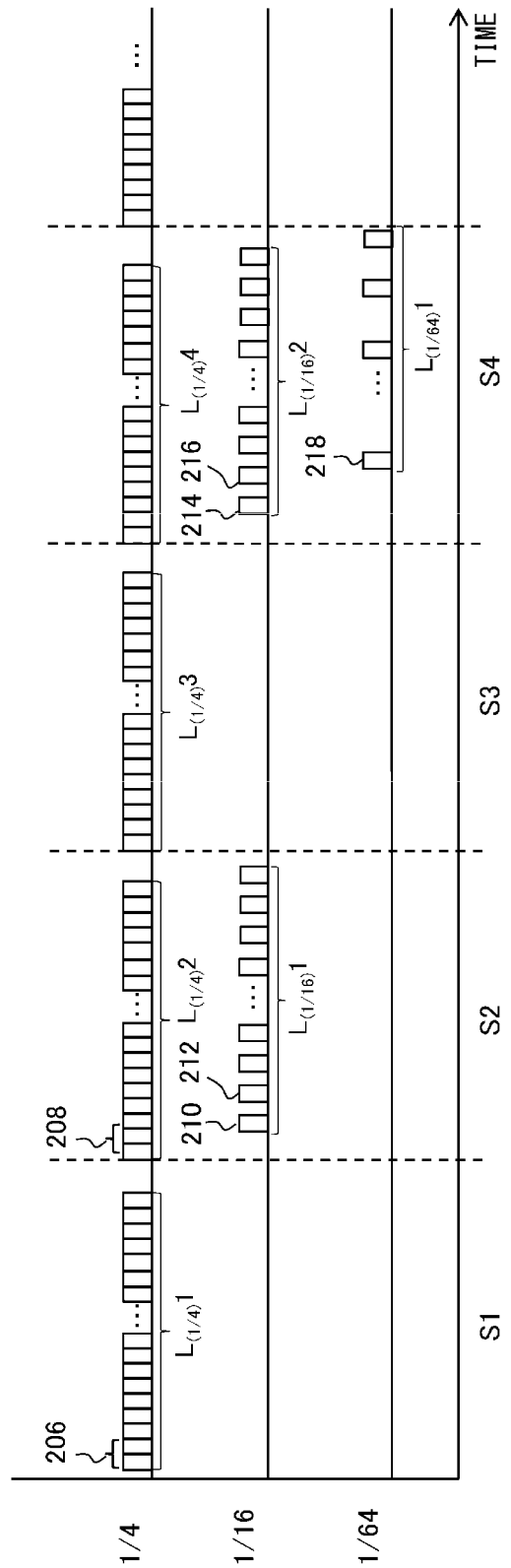
FIG. 6 is a time chart illustrating input timing of respective pixel values of a ¼ demosaiced image, a $\frac{1}{16}$ demosaiced image, and a $\frac{1}{64}$ demosaiced image from a pyramid filter unit in the first embodiment.

An explanation is now given regarding a method for synthesizing a ¼ demosaiced image, a 1/16 demosaiced image, and a 1/64 demosaiced image by the image synthesis unit 156. FIG. 6 is a time chart illustrating input timing of respective pixel values of a ¼ demosaiced image, a 1/16 demosaiced image, and a 1/64 demosaiced image from respective filters of a pyramid filter unit 170. In the figure, time steps S1, S2, S3, S4, . . . represent respective periods in which the respective pixel values of the first line, second line, third line, fourth line, . . . of the ¼ demosaiced image are input.

As in the case of the above ¼ demosaiced image, among images included in a synthesized image, an image with the highest resolution has the highest data generation rate in the pyramid filter unit 170. Thus, a period in which pixel values for a single horizontal row of the image with the highest resolution are input is set to be a reference time step, and the time step is associated with a row of pixels for a single horizontal row of the synthesized image. In other words, data for a single horizontal row of the synthesized image is generated using, as a reference cycle, a period in which pixel values for a single horizontal row of the image with the highest resolution are input.

The upper row, middle row, and lower row of the figure show input timing of a ¼ demosaiced image, input timing of a 1/16 demosaiced image, and input timing of a 1/64 demosaiced image, respectively, and a single rectangle corresponds to input for a single pixel. First, in the time step S1, pixel values of a pixel row $L_{(1/4)}1$ of the first row of the ¼ demosaiced image are input starting from the left pixel. In this time step, the 1/16 demosaiced image and the 1/64 demosaiced image are not generated and are thus not input.

Then, in the time step S2, pixel values of a pixel row $L_{(1/4)}2$ of the second row of the ¼ demosaiced image are input starting from the left pixel. At this time, a pixel row $L_{(1/16)}1$ of the first row of the 1/16 demosaiced image is generated in the pyramid filter unit 170 using pixel values of the pixel row $L_{(1/4)}1$ of the first row and pixel values of the pixel row $L_{(1/4)}2$ of the second row of the ¼ demosaiced image. Thus, pixel values of the pixel row are also input in the time step S2.

For example, pixel values that are input in a period 210 at the left end of the pixel row $L_{(1/16)}1$ of the first row of the 1/16 demosaiced image are generated using both the pixel values of two pixels that are input in a period 206 in the pixel row $L_{(1/4)}1$ of the first row of the ¼ demosaiced image and the pixel values of two pixels that are input in a period 208 in the pixel row $L_{(1/4)}2$ of the second row. Therefore, in the time step S2, input timing of pixel values of the pixel row $L_{(1/16)}1$ becomes delayed by at least two pixels compared to input timing of pixel values of pixels that correspond to the pixel row $L_{(1/4)}2$.

In the subsequent time step S3, pixel values of a pixel row $L_{(1/4)}3$ of the third row of the ¼ demosaiced image are input. In this time step, pixel values of the second row of the 1/16 demosaiced image are not generated, and the 1/64 demosaiced image is not generated either. Thus, neither of them is input. In the subsequent time step S4, that is, in a period in which pixel values of a pixel row $L_{(1/4)}4$ of the fourth row of the ¼ demosaiced image are input, pixel values of a pixel row $L_{(1/16)}2$ of the second row of the 1/16 demosaiced image are also input as in the case of the time step S2.

Furthermore, a pixel row $L_{(1/64)}1$ of the first row of a 1/64 demosaiced image is generated in the pyramid filter unit 170 using pixel values of the pixel row $L_{(1/16)}1$ of the first row and pixel values of the pixel row $L_{(1/16)}2$ of the second row of the 1/16 demosaiced image. Thus, pixel values of the pixel row are also input in the time step S4. For example, pixel values that are input in a first period 218 in a pixel row $L_{(1/64)}1$ of the first row of the 1/64 demosaiced image are generated using both the pixel values of two pixels that are input in periods 210 and 212 in the pixel row $L_{(1/16)}1$ of the first row of the 1/16 demosaiced image and the pixel values of two pixels that are input in periods 214 and 216 in the pixel row $L_{(1/16)}2$ of the second row.

Therefore, in the time step S4, input timing of the pixel row $L_{(1/64)}1$ becomes delayed by at least two pixels compared to input timing of pixel values of pixels that correspond to the pixel row $L_{(1/16)}2$. Hereinafter, by repeating the input of the respective pixel values of the images in the same way, all the respective pixel values of the ¼ demosaiced image, the 1/16 demosaiced image, and the 1/64 demosaiced image are input to the image synthesis unit 156.

As described above, the respective pixel values of the images are input in raster order as individual streams from corresponding filters of the pyramid filter unit 170. The image synthesis unit 156 connects these streams to form a single stream and outputs the stream to the image transmission unit 151. The simplest possible way is to connect respective pieces of data of the pixel values in order of input time regardless of the original images. In this case, although a synthesis process itself is easy, sorting and extraction of the pieces of data for each single row are necessary for each of the images in subsequent processes, and the processes thus become complicated.

It is also possible to collect pixel values for each of the images in each time step so as to form pixel rows and then connect those pixel rows in series. In this case, while pixel values that are input in the time steps S1 and S3 are only data of the ¼ demosaiced image, those that are input in, e.g., the step S4 are data of the three images: the ¼ demosaiced image; the 1/16 demosaiced image; and the 1/64 demosaiced image. As described, the length of data that is output varies greatly depending on a time step. Thus, for images with time steps during which data is not input, some pixel values that have been input the most recently are output using the time steps so as to almost equalize the length of data that is output in each of the time steps in the present embodiment.

Figure 7:
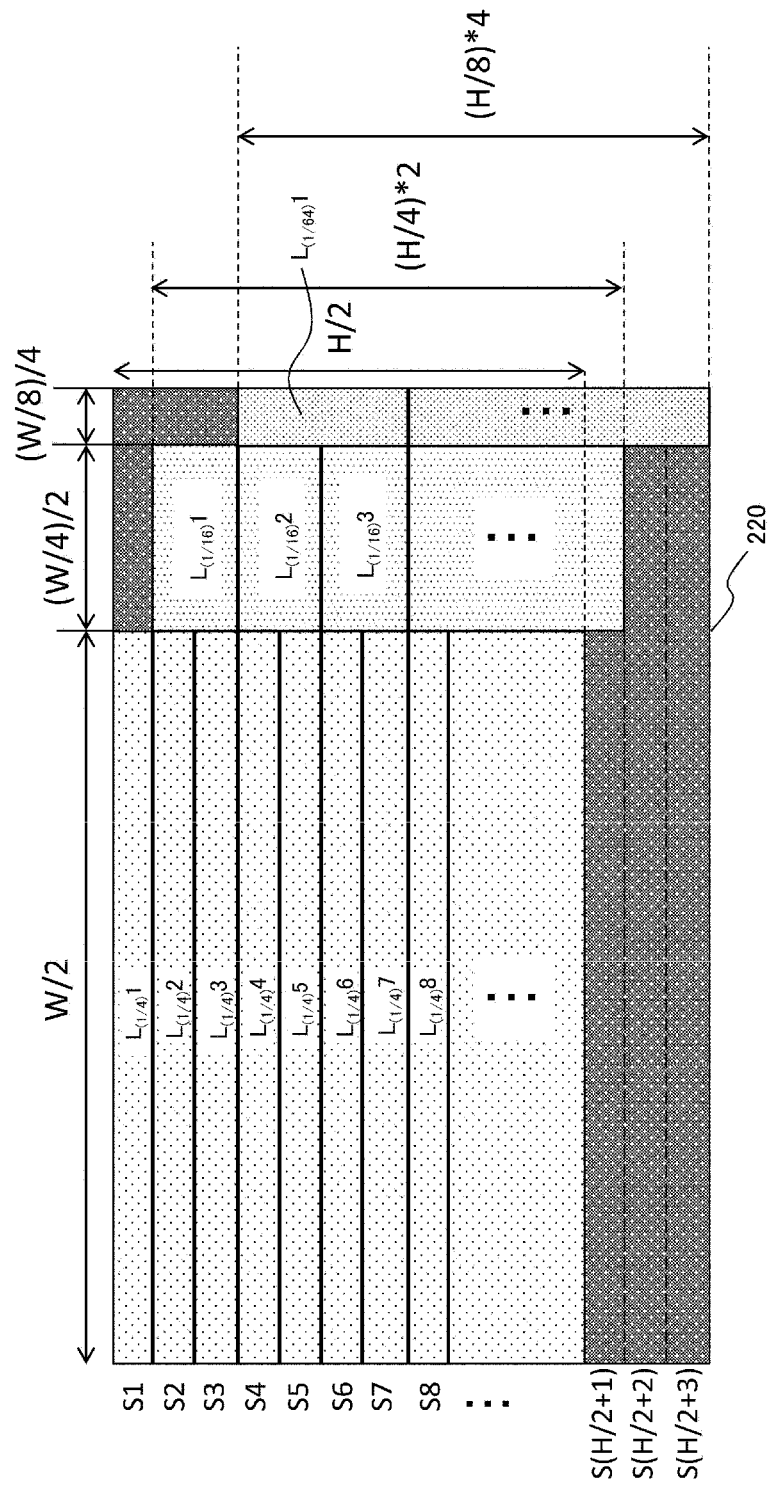
FIG. 7 schematically illustrates a state where respective pieces of data for pixel rows of a plurality of images are connected by the image synthesis unit in the first embodiment.

FIG. 7 schematically illustrates a state where respective pieces of data for pixel rows of a plurality of images are connected by the image synthesis unit 156. In the figure, S0, S1, S2, S3, . . . , are time steps that are similar to those shown in FIG. 6, and pixels values for a single row of the ¼ demosaiced image are input to each period. The figure shows, in a different shaded rectangle for each of the images, a pixel row for which data is output in each time step. As explained in reference to FIG. 6, in the time step S1, the pixel values of a pixel row $L_{(1/4)}1$ of the first row of the ¼ demosaiced image are input, and the image synthesis unit 156 thus outputs the pixel values directly. When the pixel value of the original RAW image in the horizontal direction is set to be W, the number of pixels for a single row of the ¼ demosaiced image is W/2 as shown in the figure.

In the subsequent time step S2, the pixel values of the pixel row $L_{(1/4)}2$ of the second row of the ¼ demosaiced image and the pixel values of the pixel row $L_{(1/16)}1$ of the first row of the 1/16 demosaiced image are input in parallel at the timing shown in FIG. 6. Of those pixel values, the image synthesis unit 156 temporarily stores the pixel values of the pixel row $L_{(1/16)}1$ of the first row of the 1/16 demosaiced image in the FIFO buffer 149 and sequentially outputs the pixel values of the pixel row $L_{(1/4)}2$ of the second row of the ¼ demosaiced image first.

Upon completion of the outputting of all the pixel values of the pixel row $L_{(1/4)}2$ of the second row of the ¼ demosaiced image, the image synthesis unit 156 successively reads the pixel row $L_{(1/16)}1$ of the first row of the ¹⁄16 demosaiced image from the FIFO buffer 149 and outputs the pixel row $L_{(1/16)}1$. At this time, in consideration of the amount of pixel values that is to be output in the subsequent time step S3, the image synthesis unit 156 outputs only the pixel values of the first half (left half in the image plane) of all the pixels of the pixel row $L_{(1/16)}1$ of the first row of the ¹⁄16 demosaiced image and continues to store the rest in the FIFO buffer 149.

In the subsequent time step S3, only pixel values of the pixel row $L_{(1/4)}3$ of the third row of the ¼ demosaiced image are input. The image synthesis unit 156 directly outputs the pixel values of the pixel row. Subsequently, the image synthesis unit 156 reads the pixel values of the last half (right half in the image plane), which have not been output, of the pixel row $L_{(1/16)}1$ of the first row of the ¹⁄16 demosaiced image from an internal memory and outputs the pixel values.

In the subsequent time step S4, the pixel values of the pixel row $L_{(1/4)}4$ of the fourth row of the ¼ demosaiced image and the pixel values of the pixel row $L_{(1/16)}2$ of the second row of the ¹⁄16 demosaiced image and the pixel row $L_{(1/64)}1$ of the first row of the ¹⁄64 demosaiced image are input in parallel at the timing shown in FIG. 6. Of those pixel values, the image synthesis unit 156 temporarily stores the pixel values of the pixel row $L_{(1/16)}2$ of the second row of the ¹⁄16 demosaiced image and the pixel values of the pixel row $L_{(1/64)}1$ of the first row of the ¹⁄64 demosaiced image in the FIFO buffers 149 and 150, respectively, and sequentially outputs the pixel values of the pixel row $L_{(1/4)}4$ of the fourth row of the ¼ demosaiced image first.

Upon completion of the outputting of all the pixel values of the pixel row $L_{(1/4)}4$ of the fourth row of the ¼ demosaiced image, the image synthesis unit 156 successively reads the first half of the pixel row $L_{(1/16)}2$ of the second row of the ¹⁄16 demosaiced image from the FIFO buffer 149 and outputs the first half of the pixel row $L_{(1/16)}2$. Then, the image synthesis unit 156 outputs the pixel row $L_{(1/64)}1$ of the first row of the ¹⁄64 demosaiced image. At this time, in consideration of the amount of pixel values that is to be output in the following three time steps S5, S6, and S7, the image synthesis unit 156 divides the pixel row $L_{(1/64)}1$ of the first row of the ¹⁄64 demosaiced image into four quarters and outputs only the pixel values of the first quarter. The image synthesis unit 156 stores the rest in the FIFO buffer 150.

In the subsequent time step S5, only pixel values of a pixel row $L_{(1/4)}5$ of the fifth row of the ¼ demosaiced image are input. The image synthesis unit 156 directly outputs the pixel values of the pixel row. Subsequently, the image synthesis unit 156 reads the pixel values of the last half, which have not been output, of the pixel row $L_{(1/16)}2$ of the second row of the ¹⁄16 demosaiced image from the FIFO buffer 149 and outputs the pixel values. Furthermore, the image synthesis unit 156 outputs the pixel values of the second quarter of the data, which has not been output and has been divided into four quarters, of the pixel row $L_{(1/64)}1$ of the first row of the ¹⁄64 demosaiced image.

Similarly, in the subsequent time step S6, the image synthesis unit 156 outputs the pixel values of a pixel row $L_{(1/4)}6$ of the sixth row of the ¼ demosaiced image, the pixel values of the first half of the pixel row $L_{(1/16)}3$ of the third row of the ¹⁄16 demosaiced image, and the pixel values of the third quarter of the data, which has not been output and has been divided into four quarters, of the pixel row $L_{(1/64)}1$ of the first row of the ¹⁄64 demosaiced image. In the subsequent time step S7, the image synthesis unit 156 outputs the pixel values of a pixel row $L_{(1/4)}7$ of the seventh row of the ¼ demosaiced image, the pixel values of the last half of the pixel row $L_{(1/16)}3$ of the third row of the ¹⁄16 demosaiced image, and the pixel values of the last quarter of the data, which has been divided into four quarters, of the pixel row $L_{(1/64)}1$ of the first row of the ¹⁄64 demosaiced image.

In other words, the pixel row $L_{(1/16)}1$ of the first row of the ¹⁄16 demosaiced image is output one half each in the two time steps S2 and S3. The pixel row $L_{(1/64)}1$ of the first row of the ¹⁄64 demosaiced image is output one fourth each in the four time steps S4, S5, S6, and S7. When the pixel value of the RAW image in the horizontal direction is set to be W, the number of pixels of a single horizontal row of the ¹⁄16 demosaiced image and the number of pixels of a single horizontal row of the ¹⁄64 demosaiced image are W/4 and W/8, respectively. Thus, as shown in the figure, data for (W/4)/2 pixels and data for (W/8)/4 pixels are output each per time step, respectively.

The above output processes are repeated through the respective bottom rows of the images. In this case, at the time the data for the bottom pixel row of the ¼ demosaiced image is output, the data for the last half of the bottom pixel row of the ¹⁄16 demosaiced image and the data for the remaining three-fourths of the pixels of the bottom row of the ¹⁄64 demosaiced image are not yet output. Thus, in a time step S(H/2+1) that follows immediately, the image synthesis unit 156 outputs the data for the last half of the bottom pixel row of the ¹⁄16 demosaiced image and the data for the second quarter of the bottom pixel row, which has been divided into four quarters, of the ¹⁄64 demosaiced image.

At this time, the image synthesis unit 156 first outputs invalid data as data for W/2 pixels, for which the data of the ¼ demosaiced image has been output until this time, and then outputs the data of the ¹⁄16 demosaiced image and the data of the ¹⁄64 demosaiced image. In the following two time steps S(H/2+2) and S(H/2+3), the image synthesis unit 156 first outputs invalid data as data for W/2+(W/4)/2 pixels, for which the data of the ¼ demosaiced image and the data for the ¹⁄16 demosaiced image have been output until that time, and then outputs the respective pieces of data of the third and fourth quarters of the bottom pixel row, which has been divided into four quarters, of the ¹⁄64 demosaiced image.

As shown in the figure, data for [W/2+(W/4)/2+(W/8)/4=21W/32] pixels is output at all times except for the first three time steps and the last three time steps, when the outputting is performed as described above. To output pixel values for a single row, it requires one time step for the ¼ demosaiced image, two time steps for the ¹⁄16 demosaiced image, and four steps for the ¹⁄64 demosaiced image. Thus, the number of time steps required for outputting image data for a single frame is identical for all as follows: H/2=(H/4)*2=(H/8)*4. As a result, the total number of time steps required for outputting data of the three images representing a single frame is H/2+3.

As described above, data that is output by the image synthesis unit 156 is a row of pixel values. By providing in advance the number of pixels that correspond to each time step, i.e., 21W/32, as the number of pixels of a single horizontal row, the image transmission unit 151 treats data that is output in each time step as data for a single row of an image as in the case of the RAW image and the 1/1 demosaiced image.

Therefore, by mapping each time step to pixels of an image in the vertical direction, the outputting process becomes equivalent to a generation process of a synthesized image 220 shown by an overall rectangular area in FIG. 7. By fixing a range occupied by the data of each image in a pixel row that is output in each time step, as described above, the data of the ¼ demosaiced image, the data of the ¹⁄₁₆ demosaiced image, and the data of the ¹⁄₆₄ demosaiced image each form a rectangular block area in the synthesized image 220. Therefore, segmentation of data on an image-by-image basis can be easily performed using the locality.

Figure 8:
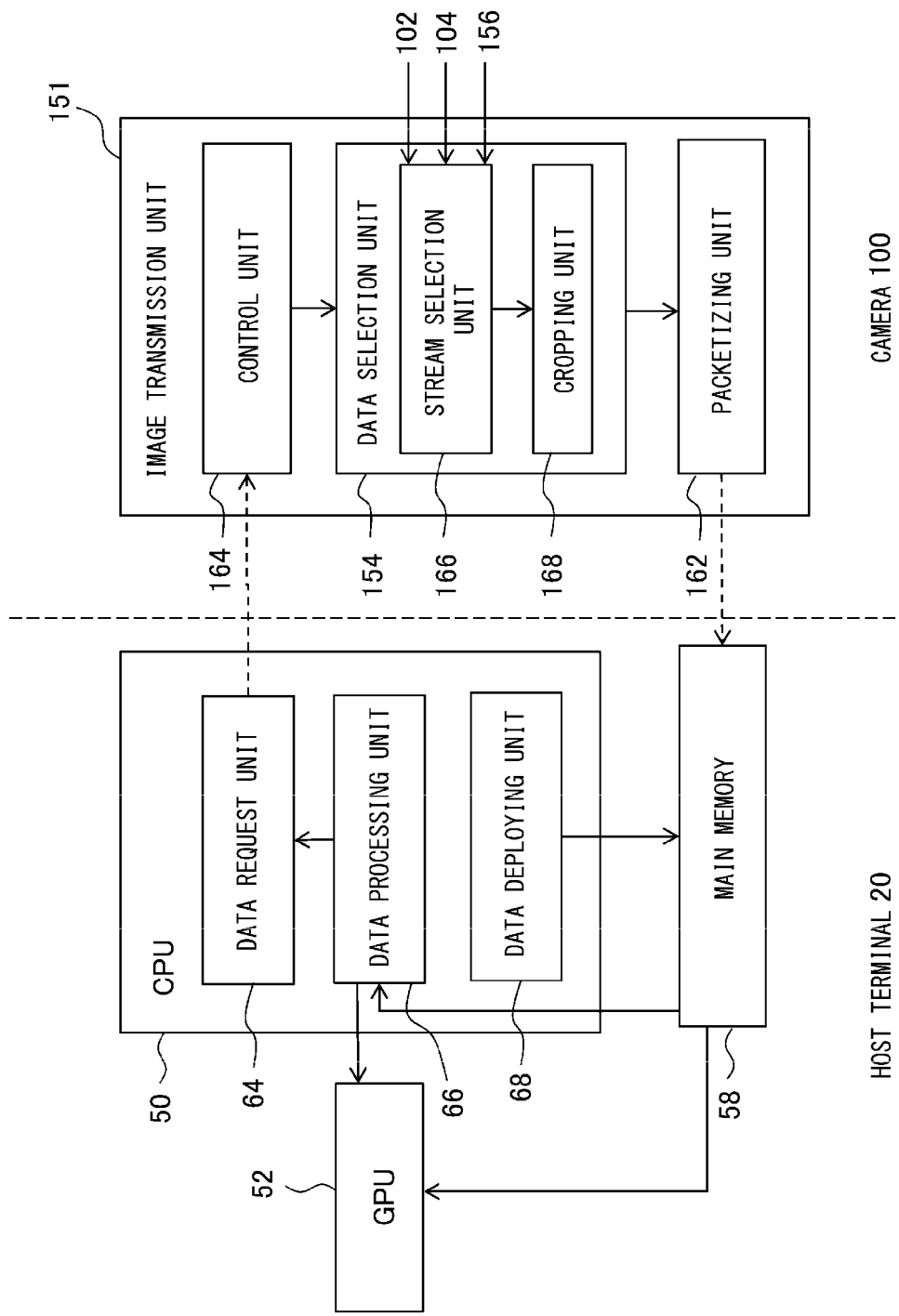
FIG. 8 is a diagram illustrating the configuration related to a data request process of the host terminal and a data transmission process of the camera in the first embodiment.

FIG. 8 illustrates the configuration related to a data request process of the host terminal 20 and a data transmission process of the camera 100. In the figure, identical reference numerals represent functional blocks that are identical to those shown in FIGS. 3 and 4, and the description thereof is partly omitted. The host terminal 20 and the camera 100 exchange various data via respective communication units thereof as described above. However, in the figure, the respective communication units are omitted. The CPU 50 of the host terminal 20 has a data request unit 64, a data processing unit 66, and a data deploying unit 68. The data selection unit 154 of the image transmission unit 151 of the camera 100 has a stream selection unit 166 and a cropping unit 168.

The data request unit 64 of the CPU 50 transmits to the camera 100 a data request signal specifying an image requested to be transmitted and an area thereof. Specified as the image requested to be transmitted is, for example, either a RAW image or a demosaiced image of each size. Specified for the area are, for example, the upper left coordinates and the widths in the horizontal and vertical directions of the area on the image plane. In addition to these, the data request unit 64 of the CPU 50 transmits to the camera 100 a signal requesting start or termination of image capturing, a signal specifying image-capturing conditions, or the like. The image-capturing conditions are, for example, a frame rate, shutter speed, white balance, an angle of view, and the like and are determined based on the performance of the camera 100, an application being executed by the CPU 50, or the like.

Upon receiving the data request signal from the data request unit 64, the control unit 164 of the image transmission unit 151 provides information thereof to the data selection unit 154. When the control unit 164 receives a signal requesting start or termination of image capturing, a signal specifying image-capturing conditions, or the like, the control unit 164 appropriately provides information thereof to the image acquisition unit 102 of the camera 100. Since a commonly-used technique can be applied in this case, a detailed explanation thereof is omitted.

The stream selection unit 166 of the data selection unit 154 reads streams of the RAW image, the 1/1 demosaiced image, and synthesized image data in parallel from the image acquisition unit 102, the demosaicing unit 104, and the image synthesis unit 156, respectively, and selects only data of image specified by the data request signal so as to output the data to the cropping unit 168. The cropping unit 168 extracts only data for pixels included in a rectangular area specified by the data request signal from the data for pixels that has been input and outputs the extracted data to the packetizing unit 162.

The process performed by the cropping unit 168 is the same as a commonly-used cropping process where an unnecessary area is removed by cutting out a specified rectangular area in an image. In the present embodiment, a processing object is not an image plane but a unit of pixel rows. However, by providing information for the number of pixels of a single horizontal row of an original image in advance, two-dimensional coordinates of an image plane can be easily mapped to one-dimensional coordinates in a stream, and specification of pixels to be cut out can be similarly performed.

In the present embodiment, the data of the ¼ demosaiced image, the ¹⁄₁₆ demosaiced image, and the ¹⁄₆₄ demosaiced image are grouped in rectangular areas on a synthesized image such as the one shown in FIG. 7. Thus, the three images can be easily cut out by this cropping process. For example, in the case of the synthesized image shown in FIG. 7, the entire area of the ¹⁄₁₆ demosaiced image can be cut out by specifying an area having an upper-left vertex at coordinates (W/2,1), a width of W/8 in the horizontal direction, and a width of H/2 in the vertical direction.

The data selection unit 154 repeats the above processes, thereby sequentially outputting the data of the area in the image specified by the data request signal in a stream format in which pixel rows are connected. Streams received by the packetizing unit 162 are packetized for each predetermined size based on the policy of the FIFO and then sequentially transmitted to the host terminal 20.

The data deploying unit 68 of the host terminal 20 deploys packets, which are received from the camera 100, as an image plane in the main memory 58 as shown in FIG. 5. Using the deployed image, the data processing unit 66 performs a process according to an application being executed. If necessary, the data processing unit 66 may request the GPU 52 to perform the image process, and the GPU 52 may read the image from the main memory 58 so as to process and synthesize the image. Image data deployed in the main memory 58 is the same as commonly-used image data and thus can be also read as texture.

The data processing unit 66 may acquire the position of a face area or a tracking object by analyzing the image deployed in the main memory 58 and provide information of the area to the data request unit 64. The data request unit 64 may specify the area and transmit a new data request signal to the camera 100 at this time. In this case, the cropping unit 168 of the camera 100 changes an area, which is to be extracted, in accordance with the specification at the time when processing a new image frame.

Figure 9:
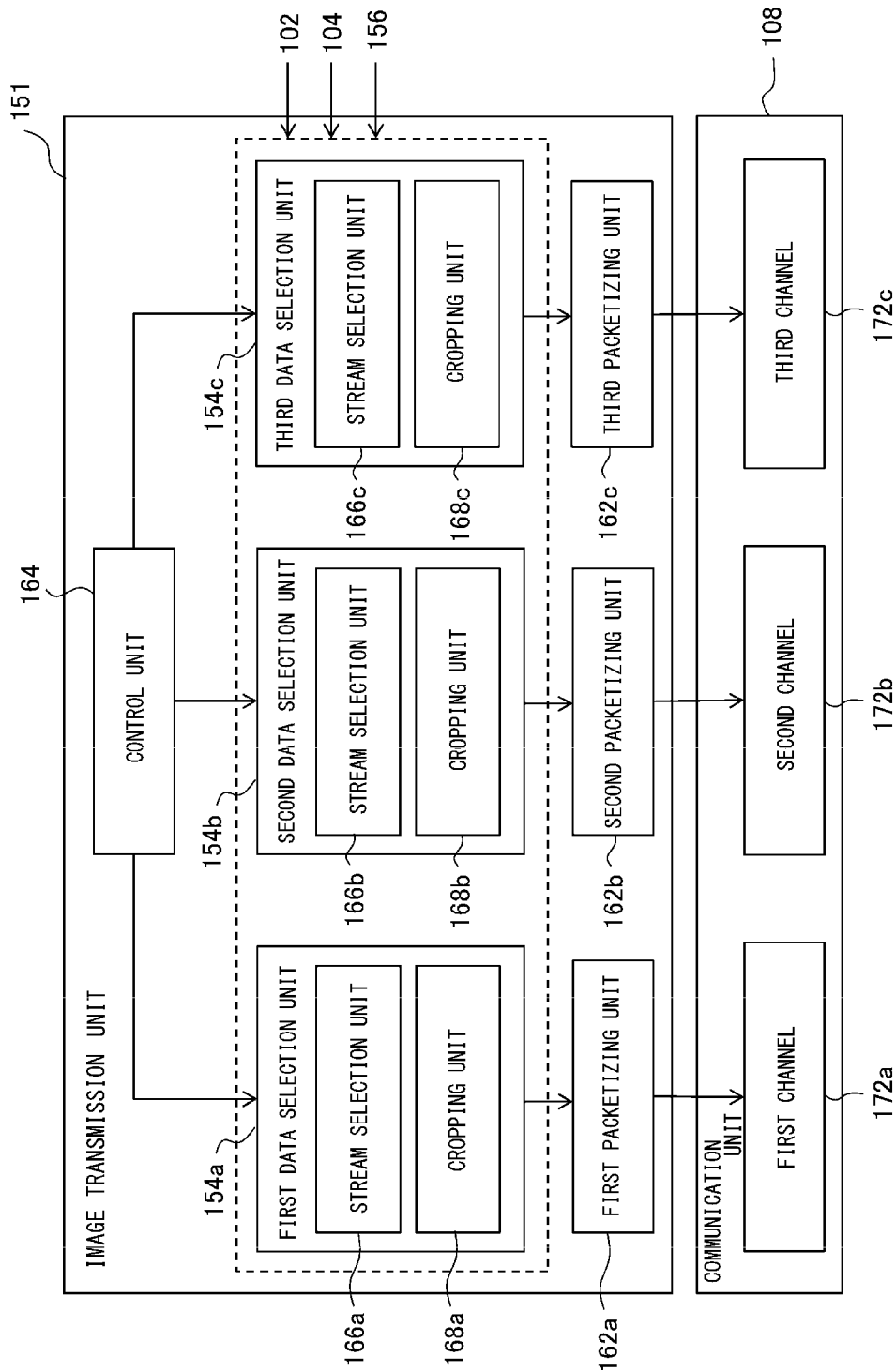
FIG. 9 is a diagram illustrating an exemplary variation of the configuration of the image transmission unit in the first embodiment.

FIG. 9 illustrates an exemplary variation of the configuration of the image transmission unit. In the figure, like reference numerals represent blocks having like functional blocks shown in FIG. 8, and the description thereof is partly omitted. In this example, an output of the image transmission unit 151 and an input and an output of the communication unit 108 have a plurality of channels. By providing the plurality of channels, respective pieces of data of different images and of different areas can be extracted in parallel and transmitted to the host terminal 20 in parallel.

In this case, the number of the channels is not particularly limited. In the figure, by providing three channels, three types of data are transmitted at the same time. Therefore, the image transmission unit 151 is provided with three data selection units: a first data selection unit 154*a*; a second data selection unit 154*b*; and a third data selection unit 154*c*, and three packetizing units: a first packetizing unit 162*a*; a second packetizing unit 162*b*; and a third packetizing unit 162*c*. The first data selection unit 154*a*, the second data selection unit 154*b*, and the third data selection unit 154*c* are connected in series to the first packetizing unit 162*a*, the second packetizing unit 162*b*, and the third packetizing unit 162*c*, respectively, so as to select, extract, and packetize respective pieces of data the units are in charge of.

Therefore, the first data selection unit 154*a*, the second data selection unit 154*b*, and the third data selection unit 154*c* have a set of a stream selection unit 166*a* and a cropping unit 168*a*, a set of a stream selection unit 166*b* and a cropping unit

168b, and a set of a stream selection unit 166c and a cropping unit 168c, respectively. The control unit 164 assigns, one each to the three data selection units, respective pieces of information for a maximum of three images and areas specified by a data request signal from the host terminal 20.

The pieces of information for the images and areas to be assigned to different channels may represent images that are all different or may represent different areas of a single image. A process performed by each set of a data selection unit and a packetizing unit is the same as that performed by the data selection unit 154 and the packetizing unit 162 shown in FIG. 8. The packets of the three streams output in parallel from the image transmission unit 151 as described above are respectively input to three channels, i.e., a first channel 172a, a second channel 172b, and a third channel 172c, that are provided in the communication unit 108 and transmitted in parallel to the host terminal 20. The transmitted pieces of data are deployed as individual images in the main memory 58 of the host terminal 20.

According to the present embodiment described above, in a system including a camera for capturing the movement of a user or the like and a host terminal for displaying an image using the camera, a moving image that has been captured is changed into data having a plurality of resolutions inside the camera. The data is then changed into a stream in which pixel values are connected in raster order of pixels for each type and resolution of an image. Then, a part thereof is transmitted in accordance with a request from the host terminal so as to construct an image in a memory of the host terminal. As described, by sequentially performing processes in a state of a pixel row without deploying the data as a frame image inside the camera, the size of a memory to be provided in the camera can be kept to a minimum. Also, since there arises no need to wait for all data for a single frame to be ready until the transmission to the host terminal after the image capturing, the system as a whole is capable of image display corresponding to the movement in low latency.

Also, image data of a plurality of resolutions is included in a single stream by connecting, for each pixel value for a single row, respective pieces of the data. A rate at which the "pixel value for a single row" is generated varies depending on a resolution. Thus, in the case of an image having a low resolution in which data is generated at a low rate, allocation is performed such that the data is included evenly in a stream even during a period in which the data is not generated. With this, the size of data to be processed and transmitted per unit time becomes equal. Thus, estimation of time required until outputting, a transmission bandwidth to be used, and time required for transmission becomes easy, and a possibility of depletion of the transmission bandwidth due to an unexpected increase in data size is decreased.

In a subsequent process, a stream generated as described can be treated in the same way as a stream composed of only image data of a single resolution. Thus, a synthesized image is substantially generated that is composed of an image having a plurality of resolutions. By connecting respective pieces of data as described above, each image to be combined forms a rectangular area in a synthesized image. Thus, by specifying an area in the synthesized image, respective pieces of data of a plurality of images that coexist in a single stream can be easily separated by a commonly-used image process called cropping.

Furthermore, by providing to the camera a plurality of mechanisms for the selection of a stream, the extraction of a part of data, and the packetization according to specification by the host terminal, a plurality of pieces of data can be transmitted in parallel, and the transmission time can be shortened. Also, since each of the mechanisms is in charge of a single stream such that transmission to the host terminal is performed for each stream, a process of data separation in the host terminal can be omitted.

Second Embodiment

In the first embodiment, the camera 100 generates moving image data having a plurality of resolutions from a video image that has been captured and transmits to the host terminal 20 only a necessary part of the data in accordance with a request from the host terminal 20 in real time. In the present embodiment, an inter-frame motion difference image is further generated and becomes subject to a request by the host terminal 20. Furthermore, in the camera 100, any image is analyzed in the camera 100, and the result thereof is added as metadata to image data to be transmitted to the host terminal 20.

The present embodiment can be achieved by a system similar to the low-latency camera system 10 shown in FIG. 1. The host terminal 20 has a configuration similar to that shown in FIG. 4. Hereinafter, an explanation is given mainly focusing on points that are different from those according to the first embodiment, and an explanation regarding points that are the same is appropriately omitted.

Figure 10:
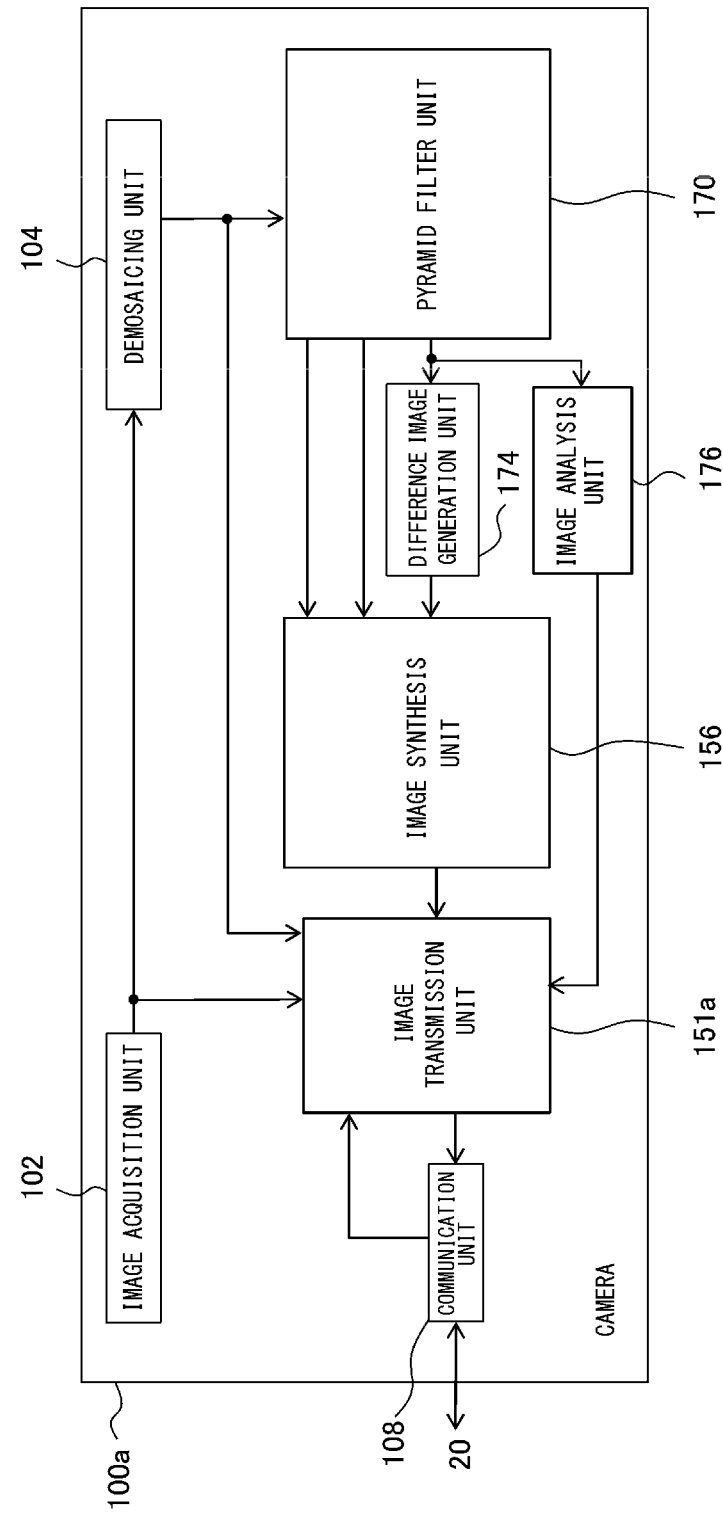
FIG. 10 is a diagram illustrating the configuration of a camera according to a second embodiment.

FIG. 10 illustrates the configuration of a camera according to the present embodiment. As in the case of the camera 100 according to the first embodiment, a camera 100a comprises an image acquisition unit 102, a demosaicing unit 104, a pyramid filter unit 170, an image synthesis unit 156, an image transmission unit 151a, and a communication unit 108. The camera 100a further has a difference image generation unit 174 and an image analysis unit 176.

The image acquisition unit 102, the demosaicing unit 104, and the pyramid filter unit 170 operate just like the corresponding functional blocks according to the first embodiment. The difference image generation unit 174 generates a difference image between an image having a predetermined resolution that is output by the pyramid filter unit 170 and an image of another frame having the same resolution that has been output previously. Therefore, the difference image generation unit 174 is provided with an internal memory (not shown) that temporarily stores image data for a single frame.

The difference image generation unit 174 obtains a difference between a pixel value that is newly output from the pyramid filter unit 170 and a pixel value of a corresponding pixel of a previous frame that is stored in the internal memory and outputs a result thereof to the image synthesis unit 156 as the pixel value of a difference image. This process is also performed in raster order. Thus, data that is output is in a stream as in the case of other images.

Depending on a purpose for using a difference image by the host terminal 20 such as a case of making a rough estimation of an area with motion, the difference image is often not required to have a high resolution. Thus, the difference image generation unit 174 generates the difference image from an image having the lowest resolution generated by the pyramid filter unit 170 such that the difference image is subject to synthesis by the image synthesis unit 156. Once the difference image becomes a part of a synthesized image, the data of the difference image can be transmitted to the host terminal 20 when the image transmission unit 151a and the communication unit 108 operate just like the way described in the first embodiment.

The image analysis unit 176 performs predetermined image analysis on an image having a predetermined resolution that is output by the pyramid filter unit 170 and provides a result thereof to the image transmission unit 151a. In the figure, an image having the same resolution is to be processed by the difference image generation unit 174 and the image analysis unit 176. However, the present embodiment is not limited to this, and the respective images having respective resolutions may be processed.

The image analysis performed by the image analysis unit 176 is a face detection process, tracking of an object having a predetermined shape, or the like. Therefore, an analysis result that is provided to the image transmission unit 151a is information regarding the position and size of a face area or the area of the object, an evaluation value showing detection/tracking accuracy, or the like. According to an application to be executed, the camera 100 is notified in advance from the host terminal 20 of conditions for analysis, such as a type of analysis to be performed and shape information of the object, e.g., at the time the application is started.

The packetizing unit 162 (shown in FIG. 3) of the image transmission unit 151a inserts as metadata a result of image analysis performed by the image analysis unit 176 immediately after a stream for a single frame of image data to be transmitted to the host terminal 20 or at a predetermined position in the stream for the single frame. The packetizing unit 162 then performs packetization at a predetermined size as in the case where the image analysis is not performed.

In this case, the host terminal 20 deploys an image-data part of data transmitted from the camera 100 in a main memory as an image and uses the metadata for a process such as processing or synthesis of the image. Using the metadata, the host terminal 20 may newly specify data to be requested to the camera 100 regarding subsequent frames. A distinction can be made between the image data and the metadata by determining in advance an area in which the metadata is added on the image plane when assuming that all received streams represent an image, or by adding information for identifying the metadata to the metadata itself.

In the present embodiment, both the difference image generation unit 174 and the image analysis unit 176 are provided to the camera 100a. However, only either one of them may be provided. Also, the information added as the metadata may not be a result of the image analysis and may be, for example, a time stamp for when the original RAW image has been acquired. In this case, information regarding a time stamp generated by the image acquisition unit 102 for each frame needs to be acquired directly by the image transmission unit 151a and then inserted in a stream as in the case described above.

According to the present embodiment described above, a mechanism for generating a difference image is provided inside the camera in addition to the configuration according to the first embodiment. In a mode where an area with motion is detected using a difference image, even a low-resolution image often functions sufficiently. Thus, for example, a generated difference image is included in a synthesized image for an image having the lowest resolution. With this, separation can be easily performed by a cropping process also for a difference image, in addition to the advantages described in the first embodiment. As a result, even in a case where an area with motion is desired to be detected, processes to be performed by a host terminal can be minimized.

Furthermore, a mechanism for detecting a face area or tracking an object having a predetermined shape is provided inside a camera, and a result thereof is inserted as metadata in a stream of image data in units of frames. With this, for example, in a case where a face area or the area of an object is desired to be processed or where detailed information of the area is desired to be obtained, processes to be performed by a host terminal can be minimized.

Third Embodiment

In the present embodiment, the camera 100 of the low-latency camera system 10 shown in FIG. 1 is formed by a stereo camera including a pair of cameras for capturing an image of a single object from different right and left viewpoints. In the stereo camera, stereo matching is performed using respective frames of two moving images captured from right and left so as to generate a depth image that shows the position of the object in the depth direction. As in the case of other images, this depth image is transmitted as needed according to a request from the host terminal 20. The host terminal 20 may have the same configuration as that described in the first embodiment. Hereinafter, an explanation is given mainly focusing on points that are different from those according to the first and second embodiments, and an explanation regarding points that are the same is omitted.

Figure 11:
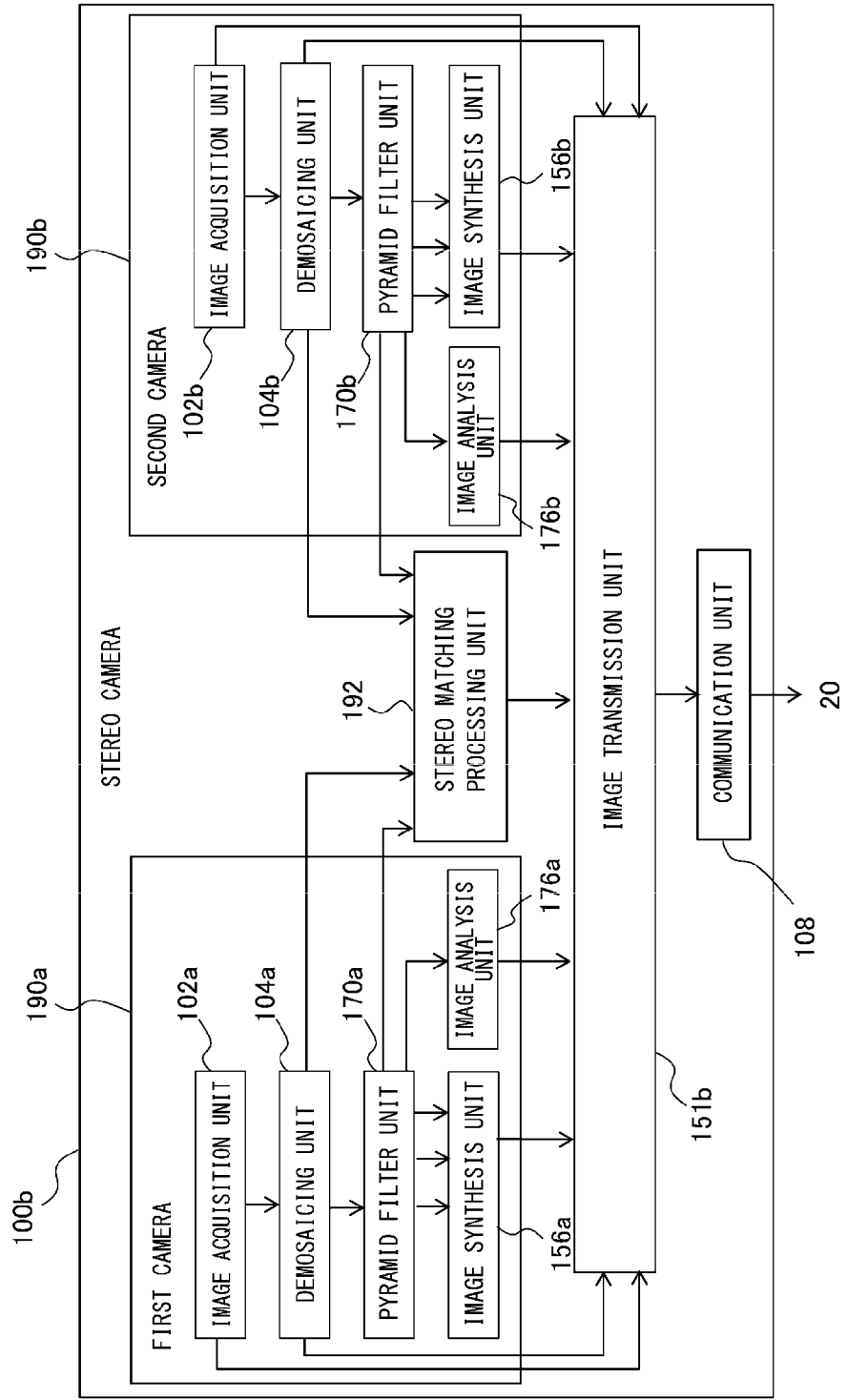
FIG. 11 is a diagram illustrating the configuration of a camera according to a third embodiment.

FIG. 11 illustrates the configuration of a camera according to the present embodiment. A stereo camera 100b comprises a first camera 190a, a second camera 190b, a stereo matching processing unit 192, an image transmission unit 151b, and a communication unit 108. The first camera 190a and the second camera 190b each have almost the same configuration as that of the camera 100 shown in the first embodiment and that of the camera 100a shown in the second embodiment. The image transmission unit 151b and the communication unit 108 are shared by the first camera 190a, the second camera 190b, and the stereo matching processing unit 192.

The first camera 190a has an image acquisition unit 102a, a demosaicing unit 104a, a pyramid filter unit 170a, an image synthesis unit 156a, and an image analysis unit 176a. Similarly, the second camera 190b has an image acquisition unit 102b, a demosaicing unit 104b, a pyramid filter unit 170b, an image synthesis unit 156b, and an image analysis unit 176b. An imaging element provided in the image acquisition unit 102a and an imaging element provided in the image acquisition unit 102b capture an image of a single object from different right and left viewpoints. The configuration of the imaging elements as hardware may be the same as that of a commonly-used stereo camera.

The functional blocks of the first camera 190a and the second camera 190b operate just like the corresponding functional blocks explained in the first and the second embodiments. The stereo matching processing unit 192 acquires, at a predetermined rate, one of right and left moving image frames having a predetermined resolution from the demosaicing unit 104a or the pyramid filter unit 170a of the first camera 190a and the other from the demosaicing unit 104b or the pyramid filter unit 170b of the second camera 190b.

The stereo matching processing unit 192 then performs stereo matching using right and left images acquired at the same timing so as to generate a depth image. The depth image is an image whose pixel value in the image plane is a value that shows the position of an object in the depth direction and shows position information of the object in a three-dimensional space. For the stereo matching process that is performed, any one of various methods that have been suggested thus far may be used. For example, an area correlation method or the like can be used where corresponding points are acquired by setting a correlation window to one of right and left images and calculating the coefficient of mutual correlation with an image with the correlation window while moving a search window of the other image so as to obtain three-dimensional position information using the principle of triangulation based on parallax between these corresponding points.

In either case, the respective pieces of data of the right and left images that have been input are processed on a row-by-row basis so as to determine a pixel value of a depth image in raster order, and the pixel value is sequentially output to the image transmission unit 151b. Along with the pieces of data of the depth image, the image transmission unit 151b acquires respective pieces of data of right and left RAW images, 1/1 demosaiced images, and synthesized images from the first camera 190a and the second camera 190b.

From the image analysis unit 176a of the first camera 190a and the image analysis unit 176b of the second camera 190b, the image transmission unit 151b receives results of image analysis just like the one explained in the second embodiment. As in the case explained in the first embodiment, the image transmission unit 151b selects data requested by the host terminal 20 and extracts and then packetizes only a requested area as necessary. As explained in the second embodiment, the image transmission unit 151b inserts the result of the image analysis acquired from the image analysis units 176a and 176b as metadata at this time depending on a request from the host terminal 20.

A process performed by the communication unit 108 is as explained thus far. In the figure, an output of the image transmission unit 151b and an input and an output of the communication unit 108 are each shown by an arrow. Alternatively, as shown in FIG. 9, a plurality of channels may be provided so that a plurality of pieces of data are transmitted in parallel.

An example is now shown of the operation of the low-latency camera system 10 that can be realized by the configurations described thus far. The example of the operation that is shown here can be achieved by the system including the stereo camera 100b explained in the third embodiment. However, the configurations described in the first and second embodiments are also appropriately combined.

Figure 12:
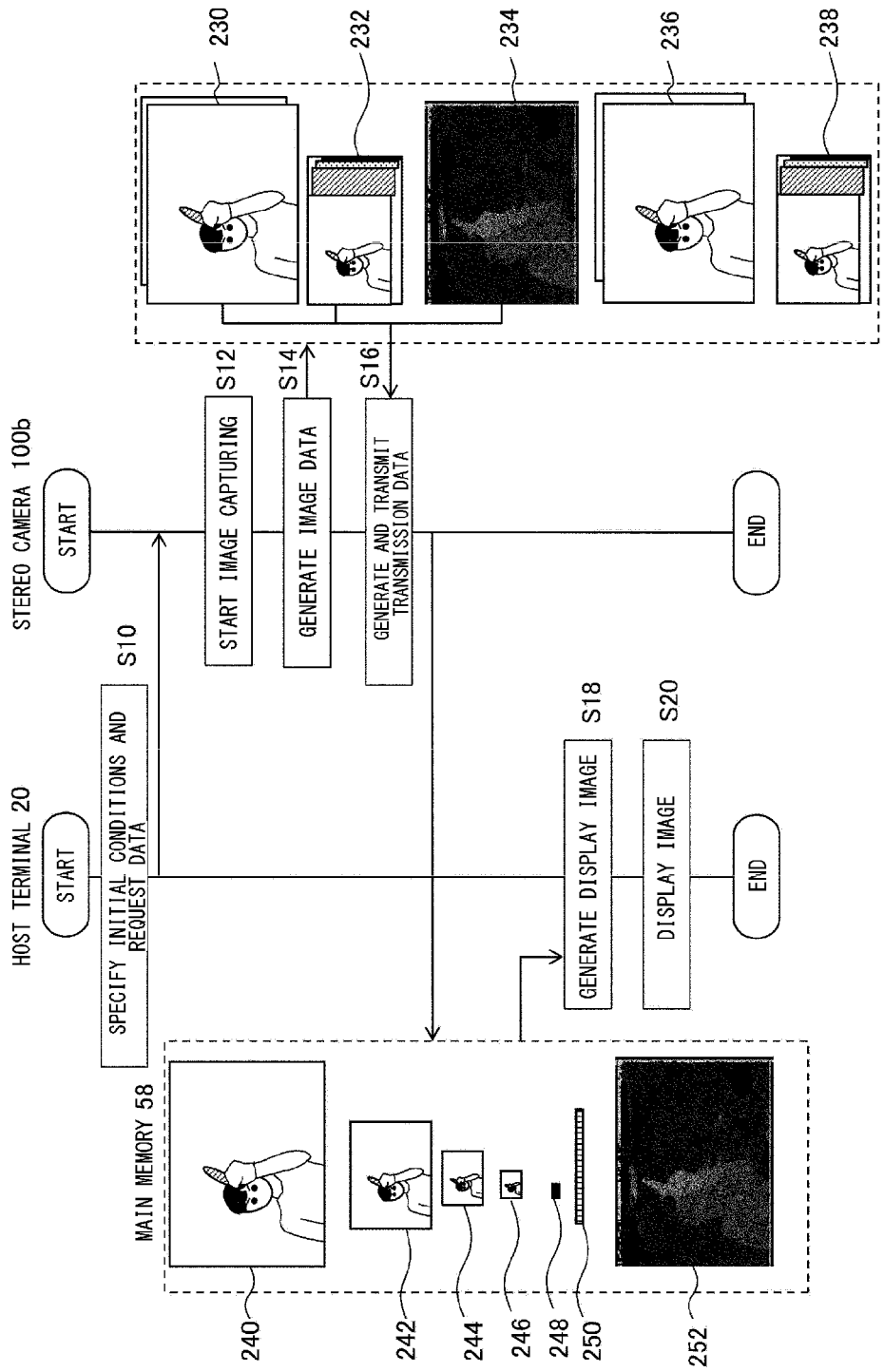
FIG. 12 is a diagram illustrating a flowchart showing an example of a processing procedure of an image process performed by a host terminal and a stereo camera in cooperation with each other in the third embodiment and illustrating image examples that are produced.
Figure 13:
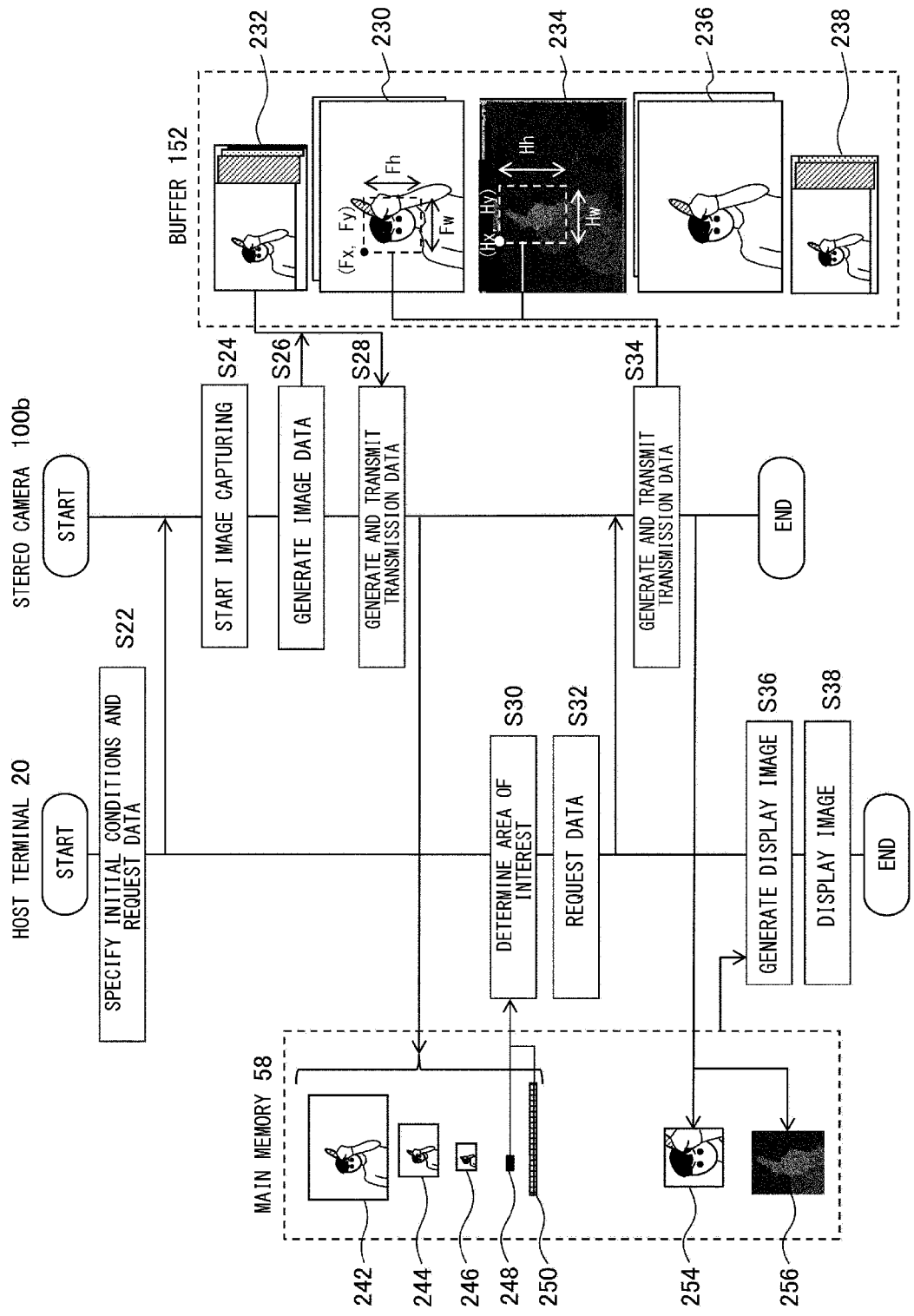
FIG. 13 is a diagram illustrating a flowchart showing another example of the processing procedure of the image process performed by the host terminal and the stereo camera in cooperation with each other in the third embodiment and illustrating image examples that are produced.

FIG. 12 illustrates a flowchart showing an example of a processing procedure of an image process performed by the host terminal 20 and the stereo camera 100b in cooperation with each other and illustrates image examples that are produced. Flowcharts shown in FIGS. 12 to 14 are started when a user inputs to the host terminal 20 an instruction for starting an application. Steps are shown by respective rectangles connected in series in order to facilitate understanding. It is assumed that these steps are performed repeatedly and in parallel for each pixel row and each frame during a period in which a moving image is being captured.

The host terminal 20 first specifies initial conditions and necessary data that are set for an application program or the like and provides the stereo camera 100b an instruction for starting image capturing and a request for transmitting data (S10). The initial conditions include the respective resolutions and frame rates of moving images captured by the two cameras of the stereo camera 100b, a resolution and a frame rate of images for which the stereo matching processing unit 192 performs stereo matching, shape information of a tracking object, and the like. For the respective resolutions and frame rates of moving images captured by the cameras, setting conditions for exposure by imaging elements may be changed. Alternatively, the resolutions and frame rates may be changed by making an adjustment such as thinning out data from the imaging elements in a subsequent stage.

In this case, for example, the initial conditions are specified as follows: First camera: resolution 1280*720, frame rate 60 fps Second camera: resolution 1280*720, frame rate 60 fps Stereo matching: resolution 1280*720, frame rate 60 fps As described above, for the specification of the necessary data, metadata may be specified as well as specifying the type and resolution of an image and an area within the image. In this case, for example, three pieces of data are specified as follows: Data 1: (left image, YUV422: 16 bit, 0, 0, 1280, 720) Data 2: (left synthesized image, YUV422: 16 bit, 0, 0, 850, 367, face area, object area, time stamp) Data 3: (depth image, Z: 16 bit, 0, 0, 1280, 720)

The data 1 represents an area whose upper left coordinates are (0,0) with widths of (1280, 720) in the horizontal and vertical directions in a 1/1 demosaiced image (YUV422: 16 bit) of an image captured by a left-side camera of the stereo camera 100b. In consideration of the resolution specified in the above initial conditions, this area can be found to be the entire area of the captured image.

The data 2 represents an area whose upper left coordinates are (0,0) with widths of (850, 357) in the horizontal and vertical directions in a synthesized image (YUV422: 16 bit) of the image captured by the left-side camera. It is assumed that synthesized images in examples shown in FIGS. 12-14 include a difference image obtained as a result of taking an inter-frame difference of the 1/256 demosaiced image with the 1/4 demosaiced image, the 1/16 demosaiced image, and the 1/64 demosaiced image shown in FIG. 7. This difference image is added at the right edge of the synthesized image shown in FIG. 7 as an image area of (W/16)/8*H/2 under a rule similar to others.

An area specified by the data 2 is the entire area of this synthesized image. In the data 2, the area of a face obtained as a result of performing a face detection process, the area of an object obtained as a result of performing a tracking process, and a time stamp at the time of capturing the original image of the synthesized image are further specified to be added to the synthesized image as metadata. The data 3 represents an area whose upper left coordinates are (0,0) with widths of (1280, 720) in the horizontal and vertical directions in a depth image (whose pixels are represented by position information of 16 bits in the depth direction) generated by the stereo matching processing unit 192. This is also the entire area.

Upon receiving the specification of the initial conditions and the data request, the first camera 190a and the second camera 190b of the stereo camera 100b start capturing a moving image under the initial conditions (S12). When the first camera 190a, the second camera 190b, and the stereo matching processing unit 192 perform processes as described above using an image frame that has been captured, respective pieces of data of a left-side RAW image and a 1/1 demosaiced image 230, a left-side synthesized image 232, a depth image 234, a right-side RAW image and a 1/1 demosaiced image 236, and a left-side synthesized image 238 are generated (S14).

The figure shows the entire area of each of the images. The actual pieces of image data are sequentially input to the image transmission unit 151b in a state of streams of pixel values. The same applies to FIGS. 13 and 14. The image transmission unit 151b then selects and extracts only the data specified in S10, generates transmission data by packetizing the data in the form of, and transmits the transmission data (S16).

Upon receiving the data, the host terminal 20 deploys images in the main memory 58. As a result, the entire area 240 of a 1/1 demosaiced image, the entire area 242 of a 1/4 demosaiced image, the entire area 244 of a 1/16 demosaiced image, the entire area 246 of a 1/64 demosaiced image, a difference image 248 of a 1/256 demosaiced image, metadata 250 containing the area of a face, the area of an object, and a time stamp, and a depth image 252 are stored in the main memory 58.

The CPU 50 and the GPU 52 of the host terminal 20 generate an image to be displayed using these pieces of data and display the image on the display 4 (S18, S20). For example, the CPU 50 and the GPU 52 detect an area with motion from the motion difference image 248 and acquire depth information of the object in the area from the depth image 252. The CPU 50 and the GPU 52 recognize a gesture of a user who is a subject by continuing this for a plurality of frames. The CPU 50 and the GPU 52 then display an image obtained by performing a predetermined process, in accordance with the gesture, on a face area or the like in the entire area 240 of the 1/1 demosaiced image.

The size of data transmitted from the stereo camera 100b to the host terminal 20 per unit time in this exemplary embodiment is 2.1 Gbps in total as shown in the following:

Data 1: (1280*720 pixels)*(60 fps)*(16 bits)=885 Mbps
Data 2: (850*370 pixels)*(60 fps)*(16 bits)=300 Mbps
Data 3: (1280*720 pixels)*(60 fps)*(16 bits)=885 Mbps FIG. 13 illustrates a flowchart showing another example of a processing procedure of the image process performed by the host terminal 20 and the stereo camera 100b in cooperation with each other and illustrates image examples that are produced. As in the case of FIG. 12, the host terminal 20 specifies initial conditions and necessary data and provides the stereo camera 100b an instruction for starting image capturing and a request for transmitting data (S22).

It is assumed that the initial conditions in this example are the same as those in the example shown in FIG. 12. As the necessary data, a single piece of data is specified as follows:

Data 1: (left synthesized image, YUV422: 16 bit, 0, 0, 850, 367, face area, object area, time stamp)

This data is the same as the data 2 in the example shown in FIG. 12.

Upon receiving the specification of the initial conditions and the data request, the first camera 190a and the second camera 190b of the stereo camera 100b start capturing a moving image under the initial conditions (S24). The first camera 190a, the second camera 190b, the stereo matching processing unit 192 each generate a piece of image data (S26). The image data generated at this time is the same as the image data generated in S14 shown in FIG. 12.

The image transmission unit 151b then selects and extracts only the data specified in S22, generates transmission data by packetizing the data in the form of streams, and transmits the transmission data (S28). Upon receiving the data, the host terminal 20 deploys images in the main memory 58. As a result, the entire area 242 of a ¼ demosaiced image, the entire area 244 of a 1/16 demosaiced image, the entire area 246 of a 1/64 demosaiced image, a difference image 248 of a 1/256 demosaiced image, and metadata 250 containing the area of a face, the area of an object, and a time stamp are stored in the main memory 58.

The CPU 50 of the host terminal 20 determines as an area of interest an area with motion specified from the difference image 248 or an area of a predetermined range including the area of the face or the area of the object contained in the metadata 250 (S30). The CPU 50 then specifies the area of interest and newly makes a data request (S32). In this case, for example, two pieces of data are specified as follows: Data 2: (left image, RAW: 16 bit, Fx, Fy, Fw, Fh) Data 3: (depth image, RAW: 8 bit, Hx, Hy, Hw, Hh)

The data 2 represents an area whose upper left coordinates are (Fx,Fy) with widths of (Fw, Fh), which is determined to be the area of interest including the area of the face, in the horizontal and vertical directions in a RAW image (16 bits) captured by the left-side camera of the stereo camera 100b. The data 3 represents an area whose upper left coordinates are (Hx,Hy) with widths of (Hw, Hh), which is determined to be the area of interest including the area of the object, in the horizontal and vertical directions in a depth image (whose pixels are represented by position information of 8 bits in the depth direction) generated by the stereo matching processing unit 192.

The image transmission unit 151b of the stereo camera 100b extracts respective pieces of data of specified areas of the RAW image and the depth image at the time when a new frame of each of the images is input, generates transmission data by packetizing the respective pieces of data in the form of streams, and transmits the packetized data (S34). Upon receiving the data, the host terminal 20 deploys images in the main memory 58. As a result, a RAW image of the area including the face and a depth image 256 of the area including the object are stored in the main memory 58.

The CPU 50 and the GPU 52 of the host terminal 20 generate an image to be displayed using these pieces of data and display the image on the display 4 (S36, S38). For example, by synthesizing the RAW image 254 of the area including the face while having a background of the ¼ demosaiced image, the CPU 50 and the GPU 52 display an image in which only the face area showing a change in facial expression or the like is clear while suppressing a data size. Furthermore, the CPU 50 and the GPU 52 may acquire the depth information of the object from the depth image 256, recognize the gesture of the user, and perform a predetermined process in accordance with the gesture.

By repeating the processes in S30-S38, even when the face and the object have been moved, necessary data related to the movement can be acquired constantly without any waste and reflected in image display. As a result, the size of data to be transmitted from the stereo camera 100b to the host terminal 20 can be suppressed.

If it is assumed in the above data specification that (Fw,Fh) is (400,600) and that (Hw,Hh) is (320,450), the size of data transmitted from the stereo camera 100b to the host terminal 20 per unit time in this exemplary embodiment is 600 Mbps in total as shown in the following:

Data 1: (850*370 pixels)*(60 fps)*(16 bits)=300 Mbps
Data 2: (400*600 pixels)*(60 fps)*(16 bits)=230 Mbps
Data 3: (320*450 pixels)*(60 fps)*(8 bits)=70 Mbps FIG. 14 illustrates a flowchart showing another example of a processing procedure of the image process performed by the host terminal 20 and the stereo camera 100b in cooperation with each other and illustrates image examples that are produced. As in the case of FIG. 12, the host terminal 20 specifies initial conditions and necessary data and provides the stereo camera 100b an instruction for starting image capturing and a request for transmitting data (S40).

The initial conditions in this example are specified as follows:

First camera: resolution 1280*720, frame rate 30 fps
Second camera: resolution 1280*720, frame rate 15 fps
Stereo matching: resolution 320*180, frame rate 15 fps The necessary data is specified as follows:

Data 1: (left synthesized image, Y (motion difference): 8 bit, 840, 8, 10, 360, time stamp)
Data 2: (left synthesized image, YUV422: 16 bit, 800, 0, 4, 40, 360, face area, time stamp)
Data 3: (depth image, Z: 8 bit, 20, 15, 280, 150, time stamp)

The data 1 represents the area of a difference image in a Y image, i.e., an area whose upper left coordinates are (840,8) with widths of (10, 360) in the horizontal and vertical directions in a synthesized image of an image captured by the left-side camera. Further in the data 1, a time stamp at the time of capturing the original image is specified to be added as metadata.

The data 2 represents an area whose upper left coordinates are (800,4) with widths of (40, 360) in the horizontal and vertical directions in a synthesized image (YUV422: 16 bit) of the image captured by the left-side camera, i.e., the area of a 1/64 demosaiced image. Further in the data 2, the area of a face obtained as a result of performing a face detection process and a time stamp at the time of capturing the original image are specified to be added as metadata. Area information of the images included in the synthesized image that are specified by the data 1 and the data 2 can be specified in accordance with the rule for arrangement shown in FIG. 7.

The data 3 represents an area whose upper left coordinates are (20,15) with widths of (280, 150) in the horizontal and vertical directions in a depth image (whose pixels are represented by position information of 8 bits in the depth direction) generated by the stereo matching processing unit 192. This is an area obtained by cutting the top edge and the bottom edge of the depth image each by an amount of 15 pixels and cutting the left edge and the right edge each by an amount of 20 pixels. The area is considered to be an area that has a meaning as depth information. The size of the data can be also suppressed in this way. Further in the data 3, a time stamp at the time of capturing the original image is specified to be added as metadata.

Upon receiving the specification of the initial conditions and the data request, the first camera 190a and the second camera 190b of the stereo camera 100b start capturing a moving image under the initial conditions (S42). The first camera 190a, the second camera 190b, the stereo matching processing unit 192 each generate a piece of image data (S44). An image obtained in this case is simple compared to the examples shown in FIGS. 12 and 13 in terms of the size of the image, a color space, a frame rate, and the like.

The image transmission unit 151b then selects and extracts only the data specified in S40, generates transmission data by packetizing the data in the form of streams, and transmits the transmission data (S46). Upon receiving the data, the host terminal 20 deploys images in the main memory 58. As a result, a difference image 260 of a 1/256 demosaiced image, a time stamp 262 of the original image thereof, the entire area 260 of a 1/64 demosaiced image, metadata 266 containing the area of a face and a time stamp, a depth image 268 whose periphery has been cut off, and a time stamp 270 of the original image thereof are stored in the main memory 58.

The CPU 50 and the GPU 52 of the host terminal 20 generate an image to be displayed using these pieces of data and display the image on the display 4 (S48, S50). For example, the CPU 50 and the GPU 52 detect an area with motion from the difference image 260 and acquire depth information of the object in the area from the depth image 268. This allows the CPU 50 and the GPU 52 to recognize a gesture of a user who is a subject and then display an image obtained by performing a predetermined process, in accordance with the gesture, on a face area or the like obtained from the metadata 266 in the entire area 260 of the 1/64 demosaiced image.

In this example, by lowering a frame rate or transmitting only an image having a low resolution, the amount of consumption of a resource including a transmission bandwidth is suppressed while keeping the entire area as a target for transmission and processing. Since the entire area is transmitted, the adaptive step for specifying an area shown in FIG. 13 can be omitted. Even when a data size for a single frame is different in three pieces of data that are transmitted such that data for a single frame arrives the host terminal 20 at a different timing depending on a piece of data, a correspondence relationship among the pieces of data can be easily identified by adding, for each frame, a time stamp at the time of capturing the original image.

The size of data transmitted from the stereo camera 100b to the host terminal 20 per unit time in this exemplary embodiment is 9.5 Mbps in total as shown in the following:

Data 1: (10*360 pixels)*(30 fps)*(8 bits)=864 kbps
Data 2: (160*90 pixels)*(15 fps)*(16 bits)=3.5 Mbps
Data 3: (280*150 pixels)*(15 fps)*(8 bits)=5 Mbps According to the present embodiment described above, features in the first and second embodiments are applied to a stereo camera. Further, a mechanism for performing stereo matching is provided in the stereo camera. In this case, data specified by the host terminal can be transmitted with low latency from among diversified data such as a RAW image generated by each camera, a 1/1 demosaiced image, a synthesized image, and a depth image obtained as a result of stereo matching, information of a face area obtained as a result of face detection, and information of the area of an object obtained as a result of a tracking process. Therefore, a processing load of the host terminal is reduced, and by the synergistic effect with an increase in the efficiency of data transmission from a camera, image display that follows the movement of a subject with low latency becomes possible.

Described above is an explanation of the present invention based on the embodiments. The embodiments are intended to be illustrative only, and it will be obvious to those skilled in the art that various modifications to constituting elements and processes could be developed and that such modifications are also within the scope of the present invention.

DESCRIPTION OF THE REFERENCE NUMERALS 4 display, 10 low-latency camera system, 20 host terminal, 50 CPU, 52 GPU, 58 main memory, 60 communication unit, 64 data request unit, 66 data processing unit, 68 data deploying unit, 100 camera, 104 demosaicing unit, 108 communication unit, 149 FIFO buffer, 150 FIFO buffer, 151 image transmission unit, 156 image synthesis unit, 154 data selection unit, 162 packetizing unit, 164 control unit, 166 stream selection unit, 168 cropping unit, 170 pyramid filter unit, 172a first channel, 172b second channel, 172c third channel, 174 difference image generation unit, 176 image analysis unit, 190a first camera, 190b second camera, 192 stereo matching processing unit

INDUSTRIAL APPLICABILITY

As described above, the present invention is applicable to an information processing device such as a computer, a camera, a game device, and an image display device.

The invention claimed is:

1. A moving image capturing device comprising:
    an image data generation unit configured to generate respective pieces of data of a plurality of images having different resolutions each in a predetermined pixel order by reducing, in multi-stages, each frame of a moving image acquired by image capturing of an object and to sequentially output the pieces of data in a form of streams;
    an image synthesis unit configured to generate, by connecting, for each row of pixels for a single horizontal row of an image or for each row of pixels in a smaller range, respective pieces of data of a plurality of predetermined images among the respective pieces of data of the plurality of images output by the image data generation unit and then by outputting the respective pieces of data of the plurality of predetermined images in a form of streams, a virtual synthesized image containing the plurality of predetermined images; and an image transmission unit configured to generate a stream of data to be transmitted, upon receiving a request for transmitting the data from a host terminal, by extracting data for pixels included in an image and an area that are requested from a plurality of streams that are output from the image data generation unit and the image synthesis unit and to transmit the stream of data to the host terminal.

2. The moving image capturing device according to claim 1, wherein the image synthesis unit outputs data for a single row of pixels of the synthesized image using, as a reference cycle, a period in which data for a single row of pixels of an image with the highest resolution is generated among images subject to synthesis and adjusts the range of rows of pixels to be connected such that data is evenly output in this generation cycle for an image with a different resolution for which data for a single row is generated in a cycle that is longer than the reference cycle.

3. The moving image capturing device according to claim 1, wherein the image transmission unit includes a cropping unit for cutting out, in units of rows of pixels that constitute a stream, a rectangular area in an image for which data transmission is requested by the host terminal, wherein image synthesis unit connects respective pieces of data of the images subject to synthesis such that each of the images constitutes a rectangular area in the synthesized image, and wherein the cropping unit cuts out any one of the images subject to synthesis from the synthesized image in units of rows of pixels and transmits an image that is cut out to the host terminal according to a request from the host terminal.

4. The moving image capturing device according to claim 1, further comprising:

a difference image generation unit configured to generate a difference image having a predetermined resolution by taking an inter-frame difference of images having the predetermined resolution among the plurality of images having different resolutions, and the image synthesis unit includes the difference image as an image subject to synthesis.

5. The moving image capturing device according to claim 1, wherein the image transmission unit reads a plurality of streams that are output from the image data generation unit and the image synthesis unit in parallel and generates a stream to be transmitted by at least a part of a stream selected from the plurality of streams according to a request from the host terminal.

6. The moving image capturing device according to claim 1, wherein the image transmission unit includes a plurality of output channels for performing data transmission to the host terminal and transmits, when respective pieces of data of a plurality of areas are requested by the host terminal, respective streams generated for the pieces of data in parallel from the plurality of output channels.

7. The moving image capturing device according to claim 1, further comprising:

a face detection unit configured to identify the area of a human face, which is an object, by performing a face detection process on any one of the plurality of images, and wherein, according to a request from the host terminal, the image transmission unit inserts, as metadata, data related to the area of the face identified by the face detection unit at a predetermined position of a stream of image data that has been generated, and transmits the stream to the host terminal.

8. The moving image capturing device according to claim 1, further comprising:

a tracking unit configured to acquire shape information of an object to be tracked from the host terminal and to perform a process of tracking the object based on the shape information, and wherein, according to a request from the host terminal, the image transmission unit inserts as metadata data related to the position of the object identified by the tracking unit at a predetermined position of a stream of image data that has been generated, and transmits the stream to the host terminal.

9. A moving image capturing device comprising a pair of cameras for capturing an image of a single object from different right and left viewpoints, wherein each of the pair of cameras includes:

an image data generation unit configured to generate respective pieces of data of a plurality of images having different resolutions each in a predetermined pixel order by reducing, in multi-stages, each frame of a moving image acquired by capturing an image of the object and to sequentially output the pieces of data in a form of streams; and an image synthesis unit configured to generate, by connecting, for each row of pixels for a single horizontal row of an image or for each row of pixels in a smaller range, respective pieces of data of a plurality of predetermined images among the respective pieces of data of the plurality of images output by the image data generation unit and then by outputting the respective pieces of data of the plurality of predetermined images in a form of streams, a virtual synthesized image containing the plurality of predetermined images, and wherein the moving image capturing device further comprises:

a stereo matching processing unit configured to generate a depth image that indicates the position of the object in a three-dimensional space in a predetermined pixel order by performing stereo matching on respective pieces of data of images having a predetermined resolution among respective pieces of data of images of different viewpoints that are generated by the pair of cameras and to sequentially output the depth image in a form of streams; and an image transmission unit configured to generate a stream of data to be transmitted, upon receiving a request for transmitting data from a host terminal, by extracting data of pixels included in an image and an area that are requested from a plurality of streams that are output from the image data generation unit, the image synthesis unit, and the stereo matching processing unit and to transmit the stream of data to the host terminal.

10. An information processing system comprising: a moving image capturing device for capturing an image of an object and generating data of a moving image; and a host terminal for acquiring a part of the data of the moving image from the moving image capturing device and displaying an image after performing a predetermined image process using the part of the data, wherein the moving image capturing device includes:
an image data generation unit configured to generate respective pieces of data of a plurality of images having different resolutions each in a predetermined pixel order by reducing, in multi-stages, each frame of a moving image acquired by image capturing and to sequentially output the pieces of data in a form of streams;
an image synthesis unit configured to generate, by connecting, for each row of pixels for a single horizontal row of an image or for each row of pixels in a smaller range, respective pieces of data of a plurality of predetermined images among the respective pieces of data of the plurality of images output by the image data generation unit and then by outputting the respective pieces of data of the plurality of predetermined images in a form of streams, a virtual synthesized image containing the plurality of predetermined images; and
an image transmission unit configured to generate a stream of data to be transmitted by extracting data for pixels included in an image and an area that are requested from a plurality of streams that are output from the image data generation unit and the image synthesis unit and then to transmit the stream of data to the host terminal.

11. An information processing device comprising:
a data request unit configured to request a camera capturing an image of an object to transmit image data of a frame of a moving image by specifying a resolution and an area within an image;
a data deploying unit configured to deploy the image data, which is transmitted from the camera according to a request, in a form of a stream in which pixel values of the specified area are connected for each row of pixels, as two-dimensional image data; and
a data processing unit configured to display an image after performing a predetermined image process using the two-dimensional image data,
wherein the data request unit specifies a synthesized image, which is generated inside the camera, in which a plurality of images having different resolutions obtained by reducing the frame of the moving image in multi-stages are arranged in respective predetermined rectangular areas, and
wherein the data deploying unit performs image separation by deploying the synthesized image transmitted from the camera into an individual piece of two-dimensional image data for each of images subject to synthesis.

12. An image data processing method performed by a moving image capturing device, comprising:
generating respective pieces of data of a plurality of images having different resolutions each in a predetermined pixel order by reducing, in multi-stages, each frame of a moving image acquired by capturing an image of an object and sequentially outputting the pieces of data in a form of streams;
generating, by connecting, for each row of pixels for a single horizontal row of an image or for each row of pixels in a smaller range, respective pieces of data of a plurality of predetermined images among the respective pieces of data of the plurality of images output in the outputting and then by outputting the respective pieces of data of the plurality of predetermined images in a form of streams, a virtual synthesized image containing the plurality of predetermined images; and
generating a stream of data to be transmitted, upon receiving a request for transmitting data from a host terminal, by extracting data for pixels included in an image and an area that are requested from a plurality of streams output in the outputting and in the generation and transmitting the stream of data to the host terminal.

13. A non-transitory computer-readable recording medium having embodied thereon a computer program product comprising:
a module configured to generate respective pieces of data of a plurality of images having different resolutions each in a predetermined pixel order by reducing, in multi-stages, each frame of a moving image acquired by capturing an image of an object and to sequentially output the pieces of data in a form of streams;
a module configured to generate, by connecting, for each row of pixels for a single horizontal row of an image or for each row of pixels in a smaller range, respective pieces of data of a plurality of predetermined images among the respective pieces of data of the plurality of images output in the module configured to output the pieces of data and then by outputting the respective pieces of data of the plurality of predetermined images in a form of streams, a virtual synthesized image containing the plurality of predetermined images; and
a module configured to generate a stream of data to be transmitted, upon receiving a request for transmitting data from a host terminal, by extracting data for pixels included in an image and an area that are requested from a plurality of streams that are output in the module configured to output the pieces of data and in the module configured to generate the virtual synthesized image and to transmit the stream of data to the host terminal.

* * * * *